US012580604B2

(12) United States Patent (10) Patent No.: US 12,580,604 B2
Wei et al. (45) Date of Patent: Mar. 17, 2026

(54) MULTI-STAGE DIGITAL CONVERTERS

(71) Applicant: Evertz Microsystems Ltd., Burlington (CA)

(72) Inventors: Jeff Wei, Richmond Hill (CA); Eric Fankhauser, Burlington (CA); Xiaobing Sun, Waterdown (CA)

(73) Assignee: Evertz Microsystems Ltd., Burlington (CA)

( * ) Notice: Subject to any disclaimer, the term of this patent is extended or adjusted under 35 U.S.C. 154(b) by 330 days.

(21) Appl. No.: 18/322,008

(22) Filed: May 23, 2023

(65) Prior Publication Data

US 2023/0387959 A1 Nov. 30, 2023

Related U.S. Application Data

(60) Provisional application No. 63/345,224, filed on May 24, 2022.

(51) Int. Cl.
H04B 1/403 (2015.01)
H04B 1/00 (2006.01)

(52) U.S. Cl.
CPC .......... H04B 1/406 (2013.01); H04B 1/0017 (2013.01); H04B 1/0021 (2013.01)

(58) Field of Classification Search
CPC ................ H04B 1/0017; H04B 1/0021; H04B 1/0406; H04B 1/0483
See application file for complete search history.

(56) References Cited

U.S. PATENT DOCUMENTS

| | | | |
|---|---|---|---|
| 5,157,395 | A | 10/1992 | Del Signore et al. |
| 6,317,765 | B1 | 11/2001 | Page et al. |
| 7,904,040 | B2 | 3/2011 | Khoini-Poorfard et al. |
| 8,295,781 | B2 * | 10/2012 | Kim .................. H04L 25/03828 |
| | | | 455/84 |

(Continued)

FOREIGN PATENT DOCUMENTS

| | | |
|---|---|---|
| CN | 103634250 A | 3/2014 |
| CN | 103957017 A | 7/2014 |

(Continued)

OTHER PUBLICATIONS

Cirrus Logic. "Low-power, Multi-channel Decimation Filter." Datasheet, CS5376A. Sep. 2008 (DS612F4), pp. 1-107.

(Continued)

*Primary Examiner* — Lester G Kincaid

(74) *Attorney, Agent, or Firm* — SMART & BIGGAR LP

(57) ABSTRACT

The present disclosure generally relates to multi-stage digital converters, including multi-stage digital down-converters (DDCs) and multi-stage digital up-converters (DUCs). In at least one example, the multi-stage digital down converter (DDC) comprises a plurality of stages, each stage comprising a frequency mixer and a decimation filter, and at least one controller coupled to one or more of the plurality of stages and operable to control one of the frequency mixer and decimation filter. In another example, the multi-stage digital up converter (DUC) comprises a plurality of stages, each stage comprising a frequency mixer and interpolation filter; at least one controller coupled to one or more of the plurality of stages and operable to control one of the frequency mixer and the interpolation filter.

18 Claims, 22 Drawing Sheets

(56) References Cited

U.S. PATENT DOCUMENTS

| | | | |
|---|---|---|---|
| 8,589,461 | B1 | 11/2013 | D'Souza et al. |
| 8,744,021 | B1 * | 6/2014 | Gurney ................ H04B 1/1036 |
| | | | 375/316 |
| 10,862,505 | B1 | 12/2020 | Rey |
| 2001/0040930 | A1 | 11/2001 | Abbey |
| 2004/0205827 | A1 | 10/2004 | Krone |
| 2017/0041129 | A1 * | 2/2017 | Nekhamkin .......... H04L 7/0041 |

FOREIGN PATENT DOCUMENTS

| | | | |
|---|---|---|---|
| EP | 3937385 | A1 | 1/2022 |
| WO | 2010044606 | A2 | 4/2010 |

OTHER PUBLICATIONS

GB2307767.0, "Combined Search and Examination Report," dated Dec. 1, 2023 (7 pages).

Zifeng Li, Qing Ma, Ronggaug Qi, "Design of a programmable digital down-converter structure," CCECE 2003, Canadian Conference on Electrical and Computer Engineering; Montreal, Canada, May 4-7, 2003, IEEE, vol. 1, pp. 535-538; XP010653855.

"Search Report under Section 17", United Kingdom Application No. GB2516042.5. Mailed Nov. 20, 2025, 4 pages.

2011 45th Asilomar Conference on Signals, Systems and Computers; An efficient cascade of half-band filters for software defined radio transmitters; Harris F, Chen X, Venosa E; IEEE; Nov. 6-9, 2011; pp. 990-994; https://ieeexplore.ieee.org/document/6190159.

* cited by examiner

MULTI-STAGE DIGITAL CONVERTERS

CROSS-REFERENCE TO RELATED APPLICATIONS

This application claims the benefit of U.S. Provisional Application No. 63/345,224 filed on May 24, 2022, the complete disclosure of which is incorporated herein by reference.

FIELD

The present disclosure generally relates to digital converters, and more particularly, to multi-stage digital converters, including multi-stage digital down-converters (DDCs) and multi-stage digital up-converters (DUCs).

INTRODUCTION

The following is not an admission that anything discussed below is part of the prior art or part of the common general knowledge of a person skilled in the art.

Digital down converters (DDCs) and digital upconverters (DUCs) are often used in digital radiofrequency (RF) applications. For instance, DDCs are used to lower the center frequency of a received digitized signal (e.g., to baseband) for further processing, as well as to reduce the digital signal sampling rate. In contrast, DUCs are used to up-sample and up-shift the center frequency of a digital signal for transmission.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one aspect, there is provided a multi-stage digital down converter (DDC) comprising: a plurality of receiving stages, including a first receiving stage for receiving an input signal, a last receiving stage for transmitting an output signal, and one or more mid-receiving stages coupled in series between the first receiving stage and the last receiving stage, wherein: each of the receiving stages has a decimation filter having a corresponding receiving stage decimation ratio to progressively decimate the sampling rate of the input signal; and at least one of the receiving stages has a controllable receiving stage decimation ratio; and a controller coupled to each of the receiving stages having a controllable decimation ratio to control an overall decimation ratio of the DDC, wherein the overall decimation ratio corresponds to the receiving stage decimation ratios of the receiving stages.

In some embodiments, the DDC includes at least one router for coupling at least some of the receiving stages to one another in series, wherein the controller is coupled to the router to control the coupling of the receiving stages.

In some embodiments, the decimation filter of one of the receiving stages includes a sample rate tracker to track the sample rate of the input signal and the sample rate of the output signal and to adjust the receiving stage decimation ratio of the corresponding receiving stage to produce an output signal with a uniform sample rate.

In some embodiments, the first receiving stage has a fixed receiving stage decimation ratio, at least some of the mid-receiving stages have variable integer stage decimation ratios and the last receiving stage has a controllable receiving stage decimation ratio.

In some embodiments, the first receiving stage has a fixed receiving stage decimation ratio, at least some of the mid-receiving stages have variable power of two stage decimation ratios and the last receiving stage has a controllable receiving stage decimation ratio between 1 and 2.

In some embodiments, at least some of the receiving stages include a frequency mixer having a respective receiving stage center frequency to downshift the input signal, and wherein the combined downshifting effect of the frequency mixers in the series path from the first receiving stage to the last receiving stage is to lower the center frequency of a selected frequency band to baseband.

In some embodiments, the center frequency of at least some of the receiving stages is controllable and the controller is coupled to the receiving stages having a controllable center frequency to control the combined downshifting effect of the frequency mixers.

In some embodiments, the first receiving stage provides coarse resolution frequency mixing, at least some of the mid-receiving stages provide coarse resolution frequency mixing and the last receiving stage has a controllable center frequency to provide fine resolution frequency mixing.

In some embodiments, the DDC includes a plurality of last receiving stages, each of the last receiving stages transmitting a respective output signal, wherein one or more of the mid-receiving stages is coupled in series between the first receiving stage and each of the last receiving stages in a fan-out architecture having a plurality of receiving signal paths, each receiving signal path extending from the first receiving stage to one of the last receiving stages, and wherein each receiving signal path has a selected overall decimation ratio corresponding to the receiving stage decimation ratios of the receiving stages in that receiving signal path.

In some embodiments, at least some of the receiving stages in each receiving signal path include a frequency mixer having a respective receiving stage center frequency, and wherein the combined downshifting effect of the frequency mixers in each receiving signal path from the first receiving stage to the corresponding last stage is to lower the center frequency of a corresponding selected frequency band to baseband.

In another aspect, there is provided a multi-stage digital up converter (DUC) comprising: a plurality of transmitting stages, including a first transmitting stage for receiving an input signal, a last transmitting stage for transmitting an output signal, and one or more mid-transmitting stages coupled in series between the first transmitting stage and the last transmitting stage, wherein: each of the transmitting stages has an interpolation filter having a corresponding transmitting stage up-sampling ratio to progressively up-sample the sampling rate of the input signal; at least one of the transmitting stages has a controllable transmitting stage interpolation ratio; and a controller coupled to each of the transmitting stages having a controllable transmitting stage up-sampling ratio to control an overall up-sampling ratio of the DUC, wherein the overall up-sampling ratio corresponds to the transmitting stage up-sampling ratios of the interpolation stages.

In some embodiments, the DUC includes at least one router for coupling at least some of the transmitting stages to one another in series, wherein the controller is coupled to the router to control the coupling of the transmitting stages.

In some embodiments, the interpolation filter of one of the transmitting stages includes a sample rate tracker to track the sample rate of the output signal and to adjust the transmitting stage up-sampling ratio of the corresponding transmitting stage to produce an output signal with a uniform sample rate.

In some embodiments, the last transmitting stage has a fixed transmitting stage up-sampling ratio and the first transmitting stage has a controllable transmitting stage up-sampling ratio.

In some embodiments, the last transmitting stage has a fixed transmitting stage up-sampling ratio, and the first transmitting stage has a controllable transmitting stage up-sampling ratio between 1 and 2.

In some embodiments, at least some of the transmitting stages include a frequency mixer having a respective transmitting stage center frequency to upshift the center frequency of the input signal, and wherein the combined upshifting effect of the frequency mixers in the series path from the first transmitting stage to the last transmitting stage is to upshift the center frequency of the input signal to a selected center frequency.

In some embodiments, the center frequency of at least some of the transmitting stages is controllable and the controller is coupled to the transmitting stages having a controllable center frequency to control the combined upshifting effect of the frequency mixers.

In some embodiments, the DUC includes a plurality of first transmitting stages, each of the first transmitting stages receiving a respective input signal, wherein one or more of the mid-transmitting stages is coupled in series between each of the first transmitting stages and the last transmitting stage in a fan-in architecture having a plurality of transmitting signal paths, each transmitting signal path extending from one of the first transmitting stages to the last transmitting stage, and wherein each transmitting signal path has a selected overall up-sampling ratio corresponding to the transmitting stage up-sampling ratios of the transmitting stages in that transmitting signal path.

In some embodiments, at least some of the transmitting stages in each transmitting signal path include a frequency mixer having a respective transmitting stage center frequency, and wherein the combined upshifting effect of the frequency mixers in each transmitting signal path from the corresponding first transmitting stage to the last transmitting stage is to up-shift the center frequency of the corresponding input signal to a center frequency corresponding to the center frequencies of the transmitting stages in that transmitting signal path.

In some embodiments, one or more of the mid-transmitting stages and the last transmitting stage operates to combine up-shifted versions of the respective input signals received at each of the first transmitting stages to produce a combined output signal at the last transmitting stage.

In another aspect, there is provided a multi-stage digital down converter (DDC) comprising a plurality of DDC stages, each DDC stage comprising a frequency mixer and a decimation filter, and at least one controller coupled to one or more of the plurality of stages and operable to control one of the frequency mixer and decimation filter.

In accordance with this aspect, each DDC stage may include: (i) one or more frequency mixers, each which is tuned to a given center frequency, and is configured to shift that center frequency from a first center frequency to a second stage-specific shifted center frequency, whereby the second center frequency is less than, or equal to, the first center frequency. The difference between the first and second center frequency may be referred to herein as a stage-specific downshift frequency difference. The controller may be operable to adjust and control the tuning center frequency, as well as the stage-specific downshift frequency difference; and/or (ii) one or more decimation filters, each which perform stage-specific frequency down-sampling. For example, the decimation filter can adjust a first input sampling frequency, associated with the input signal(s) into that stage, to second target sampling frequency. The second sampling frequency may be less than, or equal to, the first sampling frequency. The difference between the first and second sampling frequency may be referred to herein as the stage-specific down sampling difference. Each decimation filter can also filter the input signal(s), such as to generate corresponding output signal(s) that have a bandwidth that is narrower than, or equal to, the bandwidth of the input signal(s). The controller may be operable to adjust the stage-specific down sampling difference, as well as configuration settings of the decimation filter (e.g., passband, etc.).

In this manner, input signal(s) are received into the multi-stage DDC having an initial bandwidth, an initial sampling frequency and an initial center frequency, and the aggregate of all DDC stages may generate one or more corresponding output signal(s) having a target bandwidth, a target sampling frequency and a target center frequency. The target bandwidth, target sampling frequency and target center frequency may be each less than, or equal to, the input bandwidth, input sampling frequency and input center frequency, respectively.

In another aspect, there is provided a multi-stage digital up converter (DUC) comprising a plurality of DUC stages, each DUC stage comprising a frequency mixer and interpolation filter; at least one controller coupled to one or more of the plurality of stages and operable to control one of the frequency mixer and the interpolation filter.

In accordance with this aspect, each DUC stage may include: (i) one or more interpolation filters, each which perform stage-specific frequency up-sampling. For example, the interpolation filters can adjust a first input sampling frequency, associated with the input signal(s) into that stage, to a second target sampling frequency. The second sampling frequency may be equal to, or greater than, the first sampling frequency. The difference between the first and second sampling frequency may be referred to herein as the stage-specific up-sampling difference. Each interpolation filter can also include a corresponding LPF. The controller may be operable to adjust the stage-specific up sampling difference, as well as a configuration of the interpolation filter (e.g., passband, etc.); and/or (ii) one or more frequency-mixers, each which is tuned to a given center frequency, and is configured to shift that center frequency from a first center frequency to a second stage-specific shifted center frequency, whereby the second center frequency is equal to, or greater, than the first center frequency. The difference between the first and second center frequency may be referenced herein as a stage-specific frequency upshift difference. The controller may be operable to adjust and control the tuning center frequency, as well as the frequency upshift difference.

In this manner, input signal(s) are received into the multi-stage DUC 1100a having an initial bandwidth, an initial sampling frequency and an initial center frequency, and the aggregate of all stages may generate one or more corresponding output signal(s) having a target bandwidth, target sampling frequency and a target center frequency. At least the target sampling frequency and target center frequency may be each equal to, or greater than, the input sampling frequency and input center frequency, respectively.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
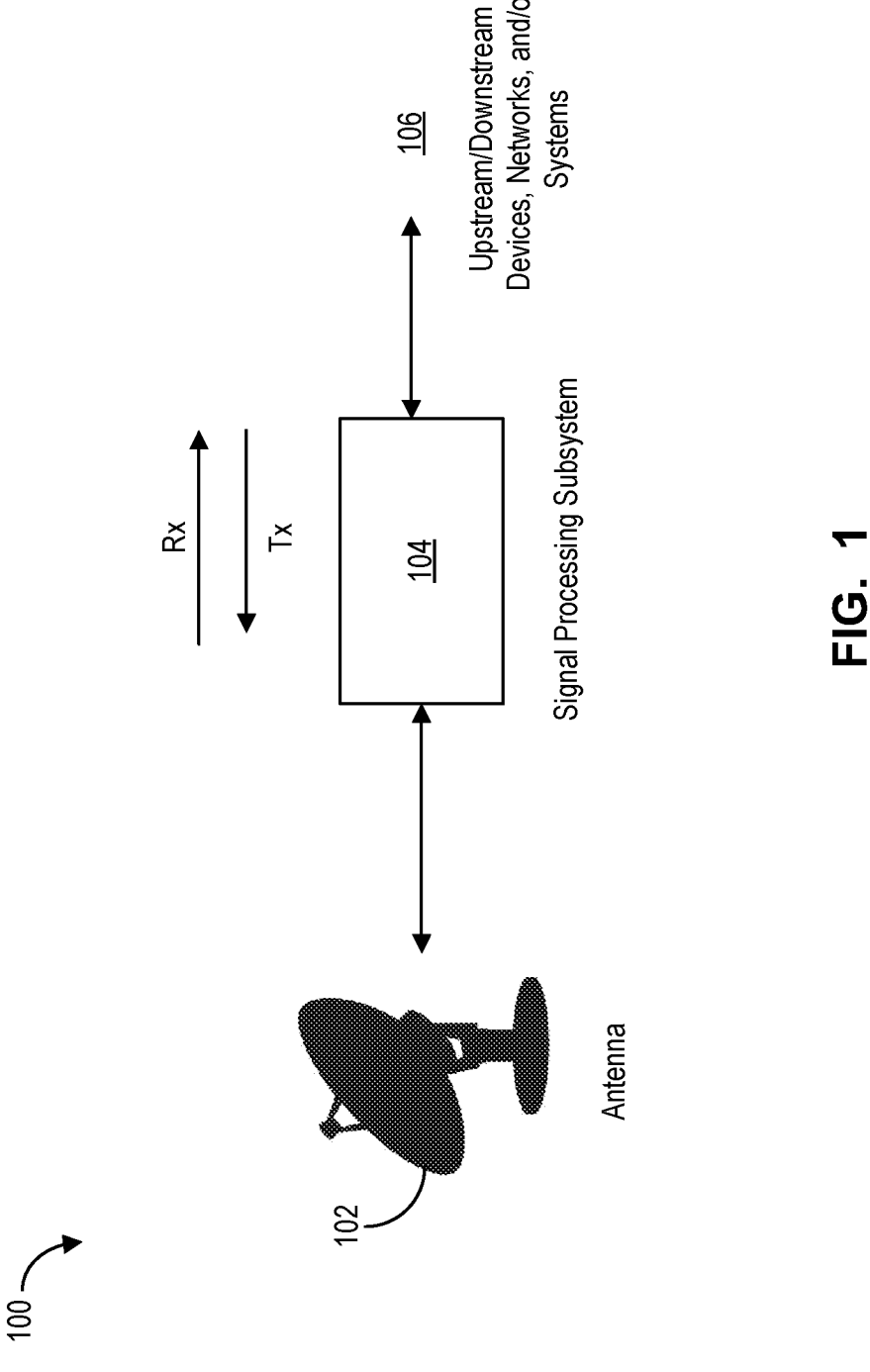
FIG. 1 is a simplified block diagram of an example antenna-based communication system.

Further aspects and features of the example embodiments described herein will appear from the following description taken together with the accompanying drawings

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more elements are said to be "coupled", "connected", "attached", "cascaded" or "fastened" where the parts are joined or operate together either directly or indirectly (i.e., through one or more intermediate parts), so long as a link occurs. As used herein and in the claims, two or more elements are said to be "directly coupled", "directly connected", "directly attached", or "directly fastened" where the element are connected in physical contact with each other. None of the terms "coupled", "connected", "attached", "cascaded" and "fastened" distinguish the manner in which two or more elements are joined together.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high-level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

In the description herein, the term "article" is used to refer to an object that is being manufactured, produced, packaged, transported, and/or distributed etc. As used herein, the term "article" may refer to a product and/or a package containing a product. An "article" may refer to a product that is intended to be received/used by a retailer, distributor and/or end-user and/or the entire package that may be received by a retailer, distributor and/or end-user including external packaging and/or containers and the goods/products contained therein.

Reference is now made to FIG. 1, which shows an example antenna-based communication system 100.

As shown, system 100 includes an antenna 102 (e.g., a satellite dish) for receiving and broadcasting radiofrequency (RF) signals. The RF signals are typically high frequency signals. For example, the signals can be one of C-band signals (4 to 8 GHz), X-band signals (8 to 12 GHz), Ku-Band signals (12 to 18 GHz), K-band signals (18 to 26.5 GHz) or Ka-Band signals (26.5 to 40 GHz).

While system 100 shows only a single antenna 102, it is understood that system 100 can include multiple antennas 102. For example, each antenna 102 may operate to receive and/or transmit signals in a different frequency band. In some example cases, a single antenna 102 may be a multi-band antenna which operates over multiple frequency bands (i.e., to transmit or receive over multiple frequency band ranges).

System 100 can also include a signal processing subsystem 104. Signal processing subsystem 104 may be coupled directly or in-directly to antenna 102. As provided herein, the signal processing subsystem 104 may include various signal processing equipment and modems. The subsystem 104 may, in turn, connect to various other upstream or downstream devices, systems and networks 106, to receive signals therefrom, or transmit signals thereto.

While not explicitly shown, in some example cases, a pre- or post-signal processing block may be located between the antenna 102 and the signal processing subsystem 104.

In more detail, along the receiving (Rx) pathway—a signal pre-processing block may include a low noise amplifier (LNA) and a block downconverter (BDC). The LNA amplifies the received low-power RF signal, without significantly degrading its signal-to-noise ratio. The BDC may further down convert the high-frequency RF signal to a lower frequency analog RF signal (also referred to as an intermediate frequency (IF)). For example, the BDC may down convert the higher frequency RF signal to a lower frequency L-band signal (i.e., 1 to 2 GHz). Lowering the frequency facilitates passing and processing of the signal through cheaper low-frequency cables and electronic components.

In the reverse transmit (Tx) pathway—a post-processing block may process an analog signal using a block-up converter (BUC) and/or a high-power amplifier (HPA). The BUC transforms a low-frequency analog RF signal to a higher-frequency RF signal. For example, this can involve transforming the intermediate frequency (i.e., L-band) signal into a higher transmission frequency (i.e., C-band, X-band, etc.). The high-power amplifier may then amplify the signal for transmission.

Figure 2A:
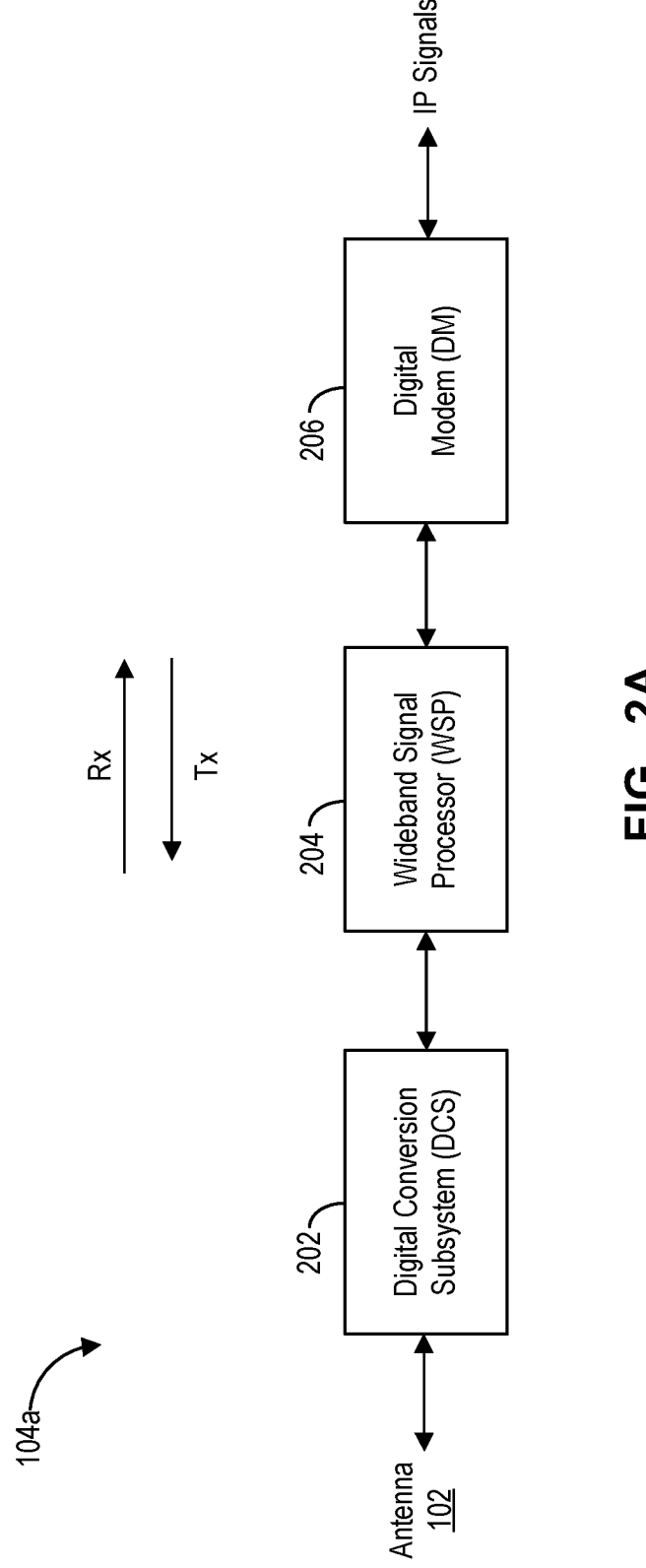
FIG. 2A is a simplified block diagram of an example signal processing subsystem.

Reference is now made to FIG. 2A, which shows a simplified block diagram of an example signal processing subsystem 104a.

As shown, the signal processing subsystem 104a can include a digital conversion subsystem (DCS) 202, a wideband signal processor (WSP) 204 and a digital modem 206. In other cases, the digital modem 206 may not be provided.

DCS 202 may perform analog-to-digital (ADC) and digital-to-analog (DAC) conversion, depending on the signal path. For example, in the receiving (Rx) pathway, the ADC— located inside the DCS 202— digitizes a received wideband analog signal, e.g., which is received via antenna 102. The digitization occurs, for example, at a sampling frequency ($f_{so}$) associated with the ADC. The DCS 202, in turn, outputs a wideband digital signal, which is fed into the WSP 204. In some example cases, the digitized wideband signal may be transmitted to the WSP 204 over Ethernet, using VITA-49-complaint sample encapsulation.

In the reverse transmit (Tx) pathway, a DAC— located inside the DSC 202— receives a wideband digital signal from WSP 204. The DAC then converts the wideband digital signal into an analog signal, which is suitable for broadcasting via antenna 102.

Turning now to operation of the WSP 204-WSP 204 may have different modes of operations depending on the signal pathway (e.g., transmitting or receiving pathway).

Figure 4:
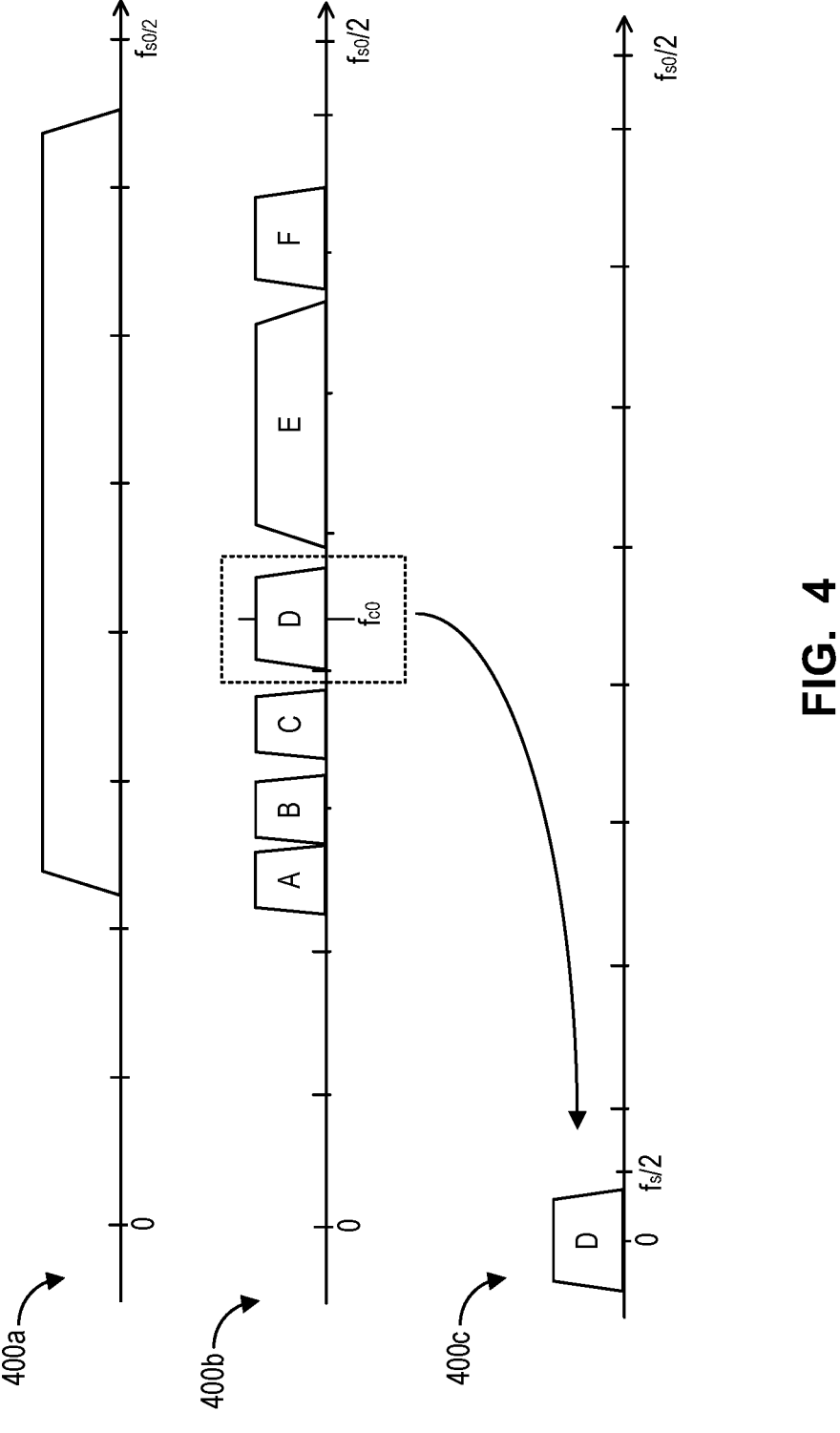
FIG. 4 is an illustration showing an example mode of operation of a digital down-converter (DDC) and digital up-converter (DUC)

In the receiving pathway, WSP 204 may perform digital signal channelization, as well as gain control management. Digital signal channelization allows the WSP 204 to filter one or more desired frequency bands (e.g., frequency channels) from a wideband digital signal. For example, as shown in FIG. 4, a wideband signal (400a) may include multiple frequency channels 'A'-'F' (400b). It may be desired to filter and extract one or more target frequency channels (e.g., frequency channel D') for transmission to downstream devices, systems and networks. Accordingly, WSP 204 may be pre-configured to output a narrower digital band signal that includes the one or more target frequency channels (400c). In some example cases, the output narrow digital band signals may be more easily processable by target downstream devices, systems and networks. The WSP 204 can also shift the center frequency of these channels to baseband (e.g., 0 Hz).

Also in the receiving pathway, WSP 204 may perform other functions including, by way of example, bandwidth management, packet routing, sampling and propagation. For instance, WSP 204 may perform sample rate adjustment to reduce the sample rate of an incident signal from an initial sample rate ($f_{so}$) (e.g., generated by the DCS 202), to a lower sampling rate. WSP 204 can also convert the filtered/rate-adjusted signal to digital quadrature baseband for processing by various downstream baseband equipment (e.g., digital modem 206, etc.).

In contrast, in the transmit pathway, WSP 204 can receive one or more narrowband digital signals, and may perform signal aggregation/combining to generate a wideband digital signal. Other functions performed by the WSP 204 in the transmit pathway include increasing the sampling rate, and upconverting digital baseband signals to higher frequency signals (e.g., IF signals) to pass on to the DCS 202.

In FIG. 2A, digital modem (DM) 206 may packetize the digital signals to generate, for example, IP (internet protocol) signals, that can be transported to various downstream devices, networks and system 106.

Figure 2B:
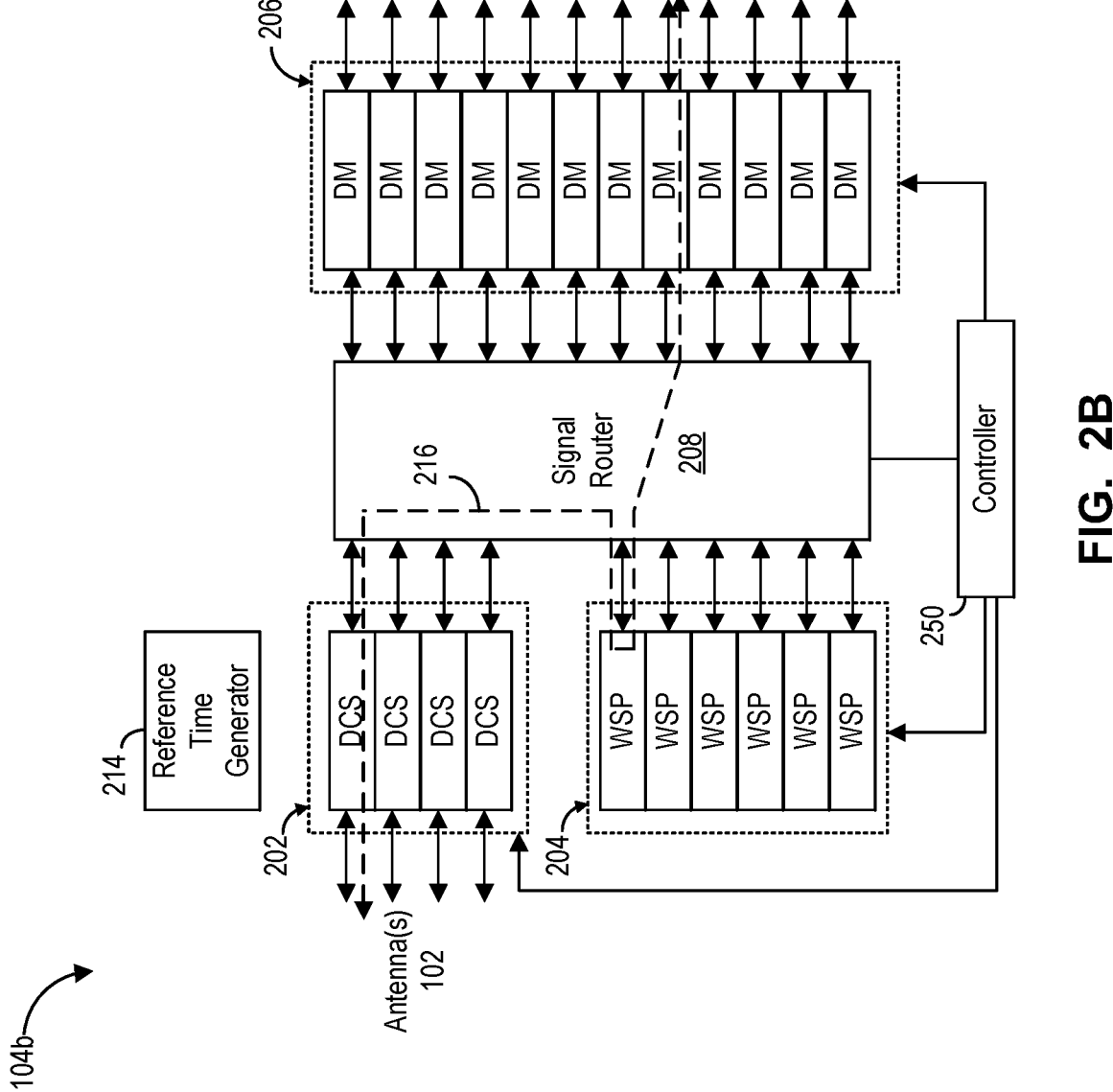
FIG. 2B is a simplified block diagram of another example signal processing subsystem.

Reference is now made to FIG. 2B, which shows another example signal processing subsystem 104b.

Signal processing subsystem 104b is a more complex variation of the signal processing subsystem 104a, and includes a larger number of DCSs 202, WSPs 204 and digital modems (DMs) 206.

In the example subsystem 104b, the plurality of DCSs 202 may be coupled to different antennas 102 to receive or transmit different wideband analog signals. In other cases, multiple DCSs 202 can be connected to the same antenna 102. For instance, multiple DCSs 202 can be connected to a single multi-band antenna.

In the receiving pathway, the wideband digital signal—output by each DCS 202 may be routed through a signal router 208. Signal router 208 may route the wideband digital signal to one or more target WSPs 204. Each WSP 204 may then extract one or more desired frequency bands (e.g., frequency channels) from the wideband digital signal. The signal router 208 may be any type of desired router, e.g., IP, SDN (software defined network), etc.

In some example cases, different WSPs 204 may extract different target frequency bands. Accordingly, the router 208 may route the same wideband digital signal to different WSPs 204 to extract (or filter) the correct frequency bands from that signal. In other cases, a single WSP 204 may filter multiple frequency bands from the same wideband digital signal. Narrowband digital signals—generated by each WSP 204— may be further routed by the signal router 208 to a desired digital modem (DM) 206.

In some example cases, the routing configuration of the signal router 208, may be controlled by controller 250. Controller 250 may have global "awareness" of different signals received from different DCSs 202 and/or their intended destinations. Accordingly, controller 250 may control routing of signals through the appropriate WSPs 204 and digital modems 206. For example, controller 250 may route different wideband digital signals from specific DCSs 202 to specific WSPs 204. For instance, based on the desired destination of a signal, and the necessary frequency bands required to be filtered from that signal—the controller 250 may route wideband signals from specific DCSs 202 to specifics WSPs 204 configured to filter the desired frequency bands. Similarly, based on the intended destinations of narrow band signals generated by WSPs 204, the signal router 208 can be configurable to route signals from specifics WSPs 204 to specifics DMs 206.

The controller 250 can also control configuration settings of one or more DCSs 202, WSPs 204 and the DMs 206.

In the reverse cases, i.e., in the transmit pathway, related signals from one or more digital modems 206 may be routed, via signal router 208, to one or more WSPs 204. WSPs 204 may aggregate these signals to generate a wideband signal, as well as up-sample the signals and up-shift their center frequencies. The wideband signals are then passed via router 208 to one or more DCSs 202.

System 104b may also include a reference time generator 214, which is explained in further detail herein.

Figure 3:
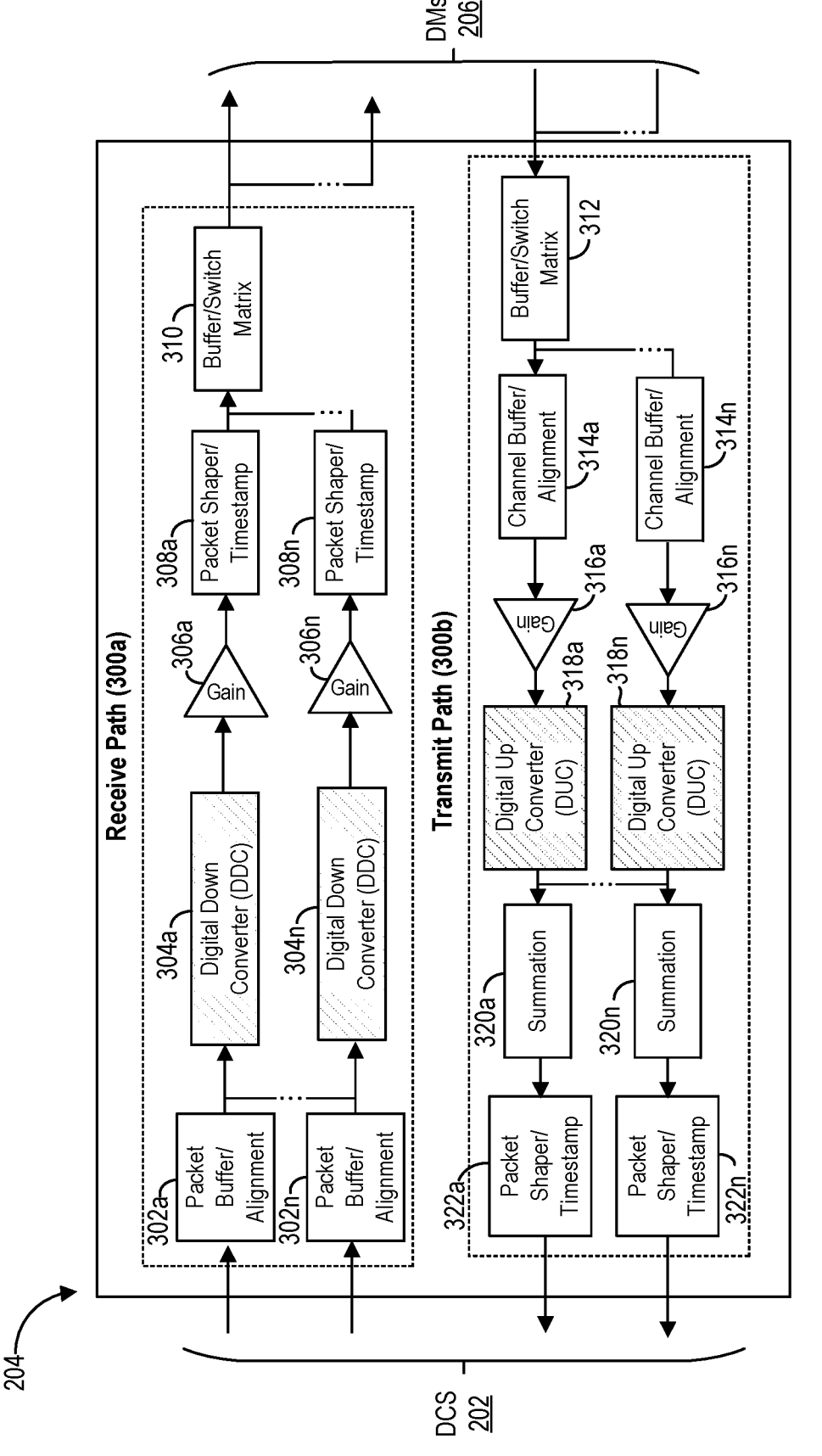
FIG. 3 is a simplified block diagram of an example wideband signal processor (WSP)

Reference is now made to FIG. 3, which shows a simplified block diagram of an example WSP 204.

As shown, WSP 204 includes a first set of components configured in the receiving pathway 300a, as well as a second set of components configured in the transmit pathway 300b.

As noted above, in the receiving pathway, WSP 204 primarily functions to receive wideband signal streams signals from one or more DCSs 202, and to perform channelization and gain control. To this end, in the receiving pathway 300a, WSP 204 may include one or more packet buffer/alignment blocks 302a-302n, which receive wideband signals. Blocks 302 function to unpackage and time align the received sample streams. The received wideband signals are then passed through one or more digital down converters (DDCs) 304a-304n.

As provided in greater detail herein, DDCs 304 can operate as channelizers to separate and filter the received signals into individual frequency bands (e.g., frequency channels), and to convert each frequency band into a respective baseband signal (e.g., 400c in FIG. 4). DDCs 304 include one or more decimation filters which filter out, and reduce the sample rates of each frequency band. Accordingly, the DDCs 304 output one or more narrowband sample streams.

Narrowband sample streams, output by DDCs 304, may then be fed through respective gain blocks 306a-306n, as well as packet shaper/timestamp blocks 308a-308n. A buffer/switch matrix 310 may pass the narrowband sample streams, along with their original/modified timestamps, to the appropriate digital modem (DM) 206.

In the reverse transmit pathway 300b, WSP 304 receives one or more digitized baseband narrowband streams—e.g., from one or more DMs 206— via the buffer/switch matrix 312. Signals are then passed through channel buffer/alignment blocks 314a-314n and are gain-level adjusted by gain blocks 316a-316n. As provided herein, digital up converters (DUCs) 318a-318n operate to interpolate the sample rate and digitally upconvert the signals to an assigned center frequency. The summation blocks 3120a-320n may then additively combine individually upconverted signals into a wideband signal (e.g., 400b in FIG. 4), for communication to the DCSs 202. One or more packet shaper blocks 322a-322n may also be included along the transmit pathway 300b.

Figures 5A, 5B:
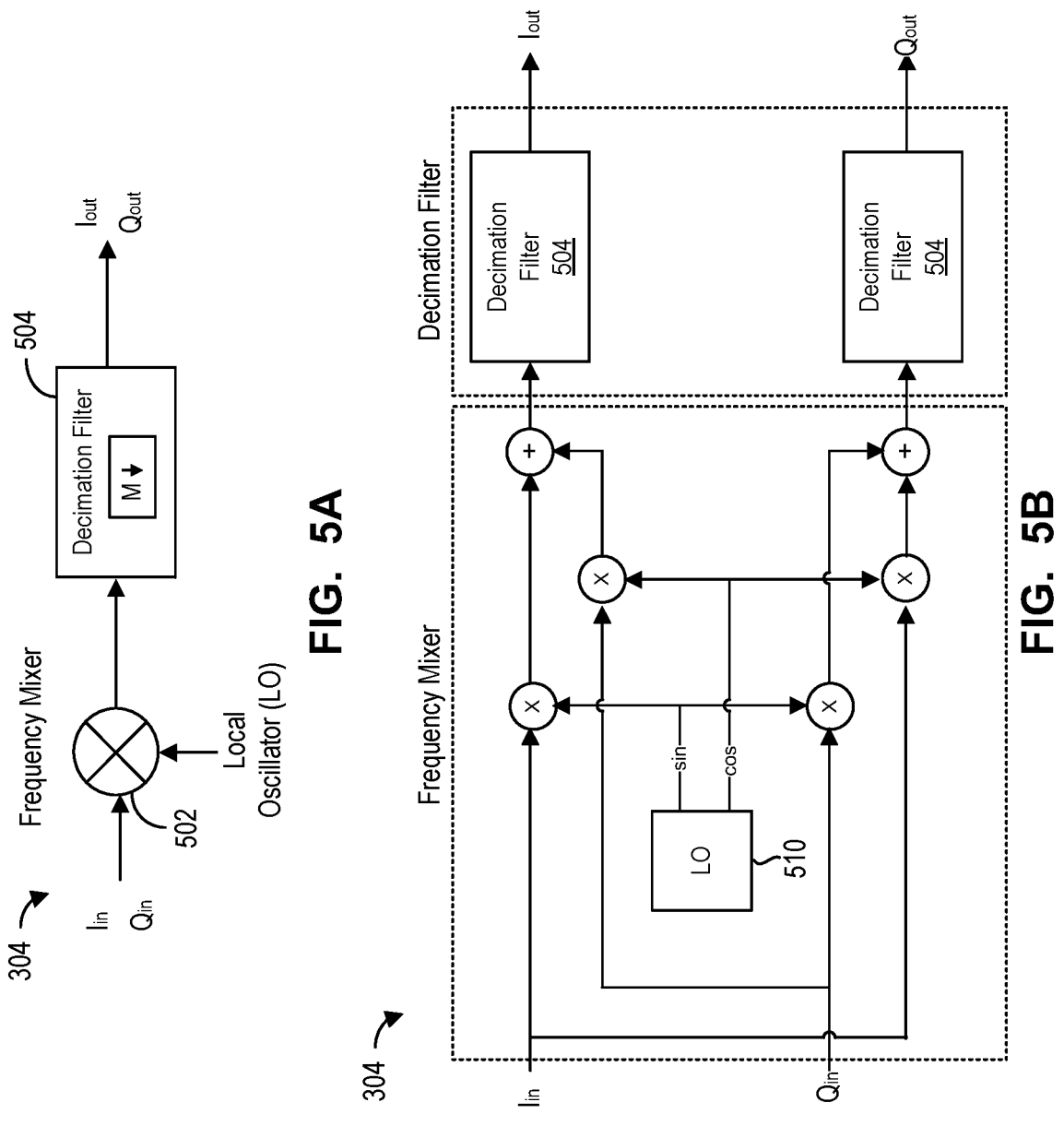
FIG. 5A is a simplified block diagram of an example single-stage digital down converter (DDC)
FIG. 5B is a simplified block diagram of an example architecture for a single-stage DDC.

Reference is now made to FIG. 5A, which shows a simplified high level block diagram for an example single-stage digital down converter (DDC) 304 that may be incorporated into the WSP 204.

As noted above, the DDC 304 primarily functions to: (i) select a frequency band from the wideband signal, e.g., received from the DSC 202, (ii) shift the center frequency, of the selected frequency band, to baseband (e.g., 400c in FIG. 4); and (iii) filter the selected frequency band, and reduce the sampling rate to generate a narrower band signal.

As shown, the DDC 304 generally includes a frequency mixer stage 502 followed by a decimation filter stage 504. Frequency mixer 502 receives in-phase and quadrature signals ($I_{in}/Q_{in}$) associated with a wideband digital signal, as well as a signal generated by a local oscillator (LO). The frequency mixer 502 multiplies the I/Q signals with sine/cosine signals received from the local oscillator (LO). In an example where the received signals are digital signals, the LO can be a numerically-controlled oscillator (NCO). The frequency mixer 502 operates to lower the center frequency ($f_c$) of a select frequency band (e.g., channel 'D' in 400c, FIG. 4), in the input I/Q signals, to baseband (e.g., zero frequency).

The output of the frequency mixer stage 502—i.e., a lower frequency digital signal—is then passed through the decimation filter 504. The decimation filter 504 may include a decimation low pass filter (LPF), which is adjusted to pass only the desired frequency band (e.g., signal channel 'D' in 400c, FIG. 4), while stopping other signal frequencies. The decimation filter also lowers or reduces the sampling frequency to generate the narrowband signal. For example, this can involve reducing the sampling frequency from a sampling frequency ($f_{s0}$) generated by a DCS 202, to a lower sampling frequency. The lower sampling frequency may be determined by the Nyquist limit of the narrowband signal.

In some example cases, the decimator filter 504 can be based on a CIC (Cascaded Integrator Comb) filter decimator and/or an FIR (Finite Impulse Response) filter.

FIG. 5B shows a more detailed architecture of the example single-stage digital down converter (DDC) 304. As shown, the DDC 304 includes the LO 510, a number of adder and multiplier blocks and one or more decimation filters 504 for each of the in-phase and quadrature signals.

In view of FIGS. 5A and 5B, it has been appreciated that a single-stage DDC may not offer an efficient solution for processing wideband digital signals. For example, it is often extremely difficult to design a local oscillator (e.g., NCO 510) with sufficiently fine resolution to shift the center frequency, of a desired frequency band, to baseband (e.g., 0 Hz). By way of example, where the resolution of the frequency mixer resolution is 1 Hz, an NCO must also be able to generate sine and cosine values in the resolution of 1 Hz. This may be more challenging where the NCO is adjustable over large frequency ranges (e.g., 200 MHz to 800 MHz) to accommodate wideband input signals.

The DDC must also achieve impractically high decimation rates. For instance, in an example case where the input frequency sampling rate is 1.8 GHz (e.g., $f_{s0}$=1.8 GHz), and the target frequency sampling rate is 192 KHz ($f_s$=192 KHz), then a decimation ratio of 9,375 is required (e.g., $f_{s0}/f_s$=9, 375). Yet, it is extremely difficult to design a single stage filter achieving achieve decimation ratios anywhere proximal to 9,375 in magnitude.

Figure 6A:
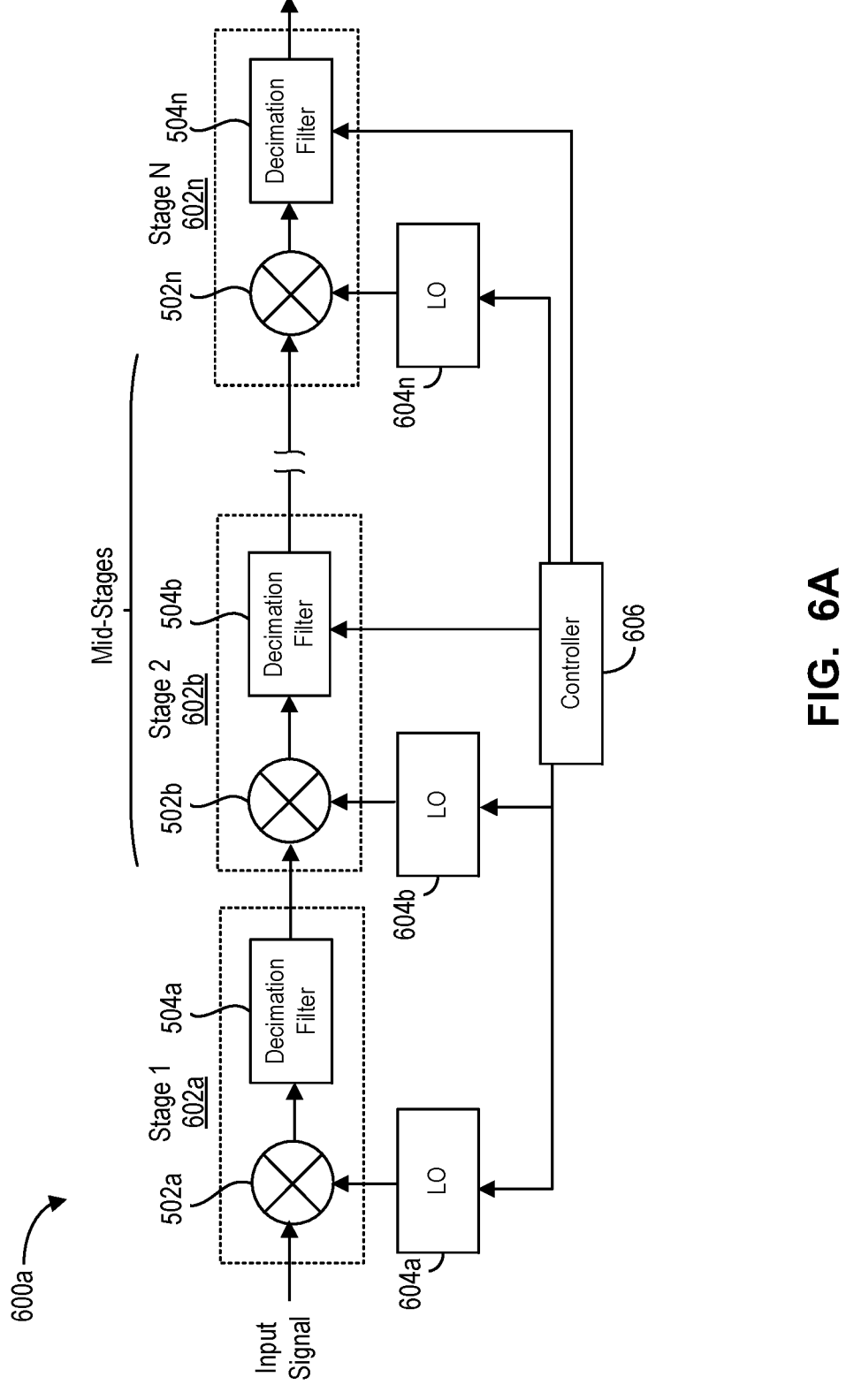
FIG. 6A is a simplified block diagram of an example multi-stage DDC.

Reference is now made to FIG. 6A, which shows a simplified block diagram for an example embodiment for a multi-stage DDC 600a.

As shown, the multi-stage DDC 600a includes multiple stages 602a-602n, which are cascaded in series. Each stage 602 includes a respective frequency mixer 502a-502n and a respective decimation filter 504a-504b. To this end, each frequency mixer 502a-502n may be connected to a respective local oscillator (LO) 604a-604n. As the DDC is processing digital signals, the LOs 604 may be numerically-controlled oscillators (NCOs).

In more detail, each DDC stage 602 may perform a portion of the desired frequency mixing and decimation filtering, such that the aggregate of all DDC stages achieve the target frequency shifting, bandwidth narrowing and signal decimation. Accordingly, and in-effect, the multi-stage DDC 600a segments (or distributes) the frequency mixing and decimation filtering over multiple stages. This, in turn, reduces the requirement for each individual stage. For example, it is not required that any one stage effects large down shifts in the center frequency of the desired target frequency band, or otherwise, performs very large decimations.

Figure 6B:
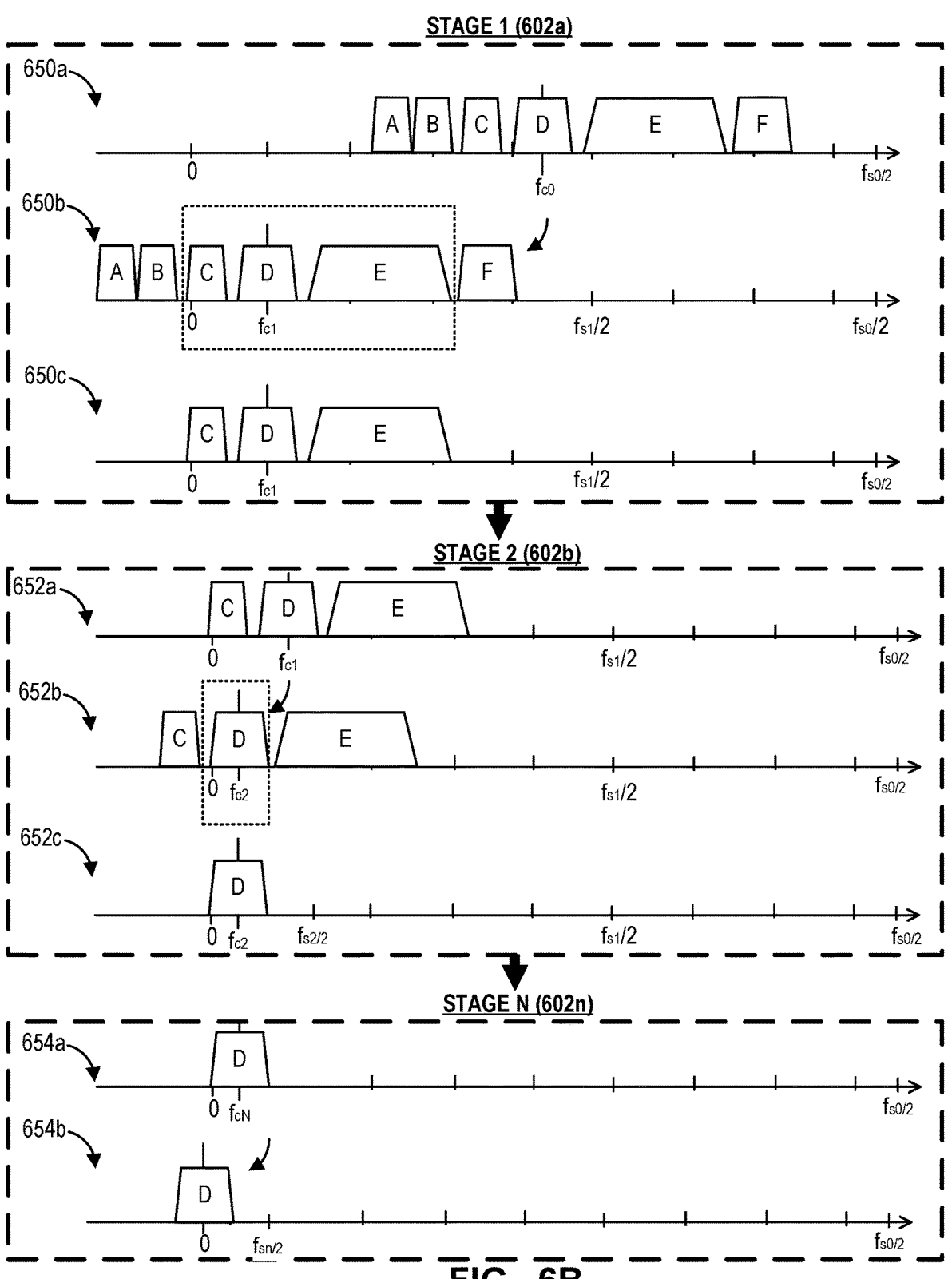
FIG. 6B is an illustration showing an example mode of operation of the multi-stage DDC of FIG. 6A.

FIG. 6B provides a visual illustration to further clarify an example mode of operation for the multi-stage DDC 600a of FIG. 6A.

As shown, the multi-stage DDC 600a may receive a wideband digital sub-band signal 650a, e.g., from DSC 202. The wideband digital sub-band signal may include multiple frequency channels CA' to 'F', as previously described. In this example, it may be desirable to extract and filter only frequency channel CD', having an initial center frequency ($f_{oo}$). The wideband digital signal 650a may have an initial sampling frequency ($f_{s0}$).

At the first stage 602a (FIG. 6A), the frequency mixer 502a may initially shift the center frequency, of the target frequency band, from the initial center frequency ($f_{oo}$) to a first shifted center frequency ($f_{c1}$) (see e.g., 650b in FIG. 6B). The first shifted center frequency ($f_{c1}$) may be located somewhere between zero frequency and the initial center frequency ($f_{c0}$) ($0 < f_{c1} < f_{c0}$).

The first stage decimation filter 504a may filter out a portion of the frequency channels. For example, as shown in 650c in FIG. 6B, frequency channels 'C' to CE' are maintained. Accordingly, the filtering may generate a narrower bandwidth signal, e.g., including frequency channels 'C' to CE'.

As the narrower bandwidth signal has a lower shifted frequency—a lower Nyquist frequency can be selected for the decimation sampling. In turn, this enables reducing the sample rate from a sampling rate ($f_{s0}$) to a lower sampling rate ($f_{s1}$), which can reduce the data rate required to transmit the signal.

At the second stage 602b in FIG. 6A, the frequency mixer 502b may again lower the center frequency corresponding to channel D' from the first shifted center frequency ($f_{c1}$) to a second shifted center frequency ($f_{c2}$) (652a to 652b in FIG. 6B), whereby $0 < f_{c2} < f_{c1}$. The LPF inside the decimation filter 504b may then further filter (i.e., maintain) the frequency channel D' to generate a further narrower band signal including the frequency channel D'. Decimation filter 504b may then decimate the narrower signal to further lower the sampling rate from sampling rate ($f_{s1}$) to a reduced sampling rate ($f_{s2}$). The lower sampling rate is again facilitated by the lower Nyquist frequency resulting from shifting the signal to a lower center frequency, and further filtering out higher band signals.

At the last stage 602n in FIG. 6A, and in the example shown, the frequency channel CD' may be shifted from an N-shifted center frequency ($f_{cN}$) (654a) to the zero-centered frequency 654b. The signal may again be filtered and/or further decimated.

In view of the foregoing, it will be appreciated that the multi-stage DDC 600a is designed to reduce the overall complexity of each individual stage, such that the frequency mixing, and decimation filtering occurs in a gradual and distributed manner. It will be understood that FIG. 6B only exemplifies one mode of operation of the multi-stage DDC 600a. In particular, other design configurations are possible which achieve different center frequency shifting, frequency filtering and decimation sampling at each stage to achieve the same end outcome. Further, any desired output center frequency and sampling rate may be achieved by the multi-stage DDC.

In some examples, it can be said that each DDC stage includes: (i) one or more frequency mixers 502, each which is tuned to a given center frequency, and is configured to shift that center frequency from a first center frequency to a second stage-specific shifted center frequency, whereby the second center frequency is less than, or equal to, the first center frequency. The difference between the first and second center frequencies may be referred to herein as a stage-specific frequency downshift difference. The controller 606 may be operable to adjust and control the tuning center frequency, as well as the stage-specific frequency downshift difference; and/or (ii) one or more decimation filters 504, each which perform stage-specific frequency down-sampling. For example, the decimation filter 504 can adjust a first input sampling frequency, corresponding to the input signal(s) into that stage, to second target sampling frequency. The second sampling frequency may be less than, or equal to, the first sampling frequency. The difference between the first and second sampling frequency may be referred to herein as the stage-specific down sampling difference. Each decimation filter 504 can also filter the input signal(s), such as to generate corresponding output signal(s) that have a bandwidth that is less than, or equal to, the bandwidth of the input signal(s). The controller may be operable to adjust the stage-specific down sampling difference, as well as a configuration setting of the decimation filter (e.g., passband, etc.).

In this manner, input signal(s) are received into the multi-stage DDC 600a having an initial bandwidth, an initial sampling frequency and an initial center frequency, and the aggregate of all DDC stages may generate one or more corresponding output signal(s) having a target bandwidth, a target sampling frequency and a target center frequency. The target bandwidth, target sampling frequency and target center frequency may be each less than, or equal to, the input bandwidth, input sampling frequency and input center frequency, respectively.

Referring back to FIG. 6A, each of the DDC stages 602a-602n may be either a fixed stage or a variable stage. A fixed stage refers to a stage wherein operation of the decimation filter 504 may be pre-configured to apply the same filter and decimation ratio, irrespective of the input signal. In FIG. 6A, stage 1 (602a) represents a fixed DDC stage.

A variable DDC stage may refer to a stage where the decimation stage 504 is variably controllable. For example, in stage 2 (602b) in FIG. 6A, a controller 606 may couple to the decimation filter 504. For instance, in stage 2 (602b), the controller 606 is coupled to the decimation filter 504b. The controller 606 may control the size of the low pass filter in the decimation filter 504, as well as the output sampling rate of the decimator filter. In this manner, the controller 606 may allow an operator to adaptably configure the settings of the multi-stage DDC 600a to filter out different frequency channels at different stages.

In either case, controller 606 may be operable to control the local oscillator 604b to tune to different center frequencies, and to shift these center frequencies by desired frequency shifts.

Controller 606 may be the same, or a different controller, than controller 250 of FIG. 2B.

In at least one example, the multi-stage DDC 600a may be configured such that, at the first stage 602a— where the input data rate is very high—coarse resolution frequency mixing and a fixed decimation ratio are used. Further, one or more mid-stages may be provided for coarse resolution frequency mixing and using variable integer decimation ratios (e.g., decimation ratio of 2). Finally, the last DDC stage may provide fine resolution frequency mixing, and variable decimation (e.g., 1 to 2 decimation ratio).

More particularly, the coarse resolution frequency mixing, at the first stage 602a, can accommodate for the initial high input data rate. In some example cases, the frequency shifting and decimation ratio are the highest at the first stage than any other stage. In one example, the coarse resolution may be expressed by $f_{s0}/64$, whereby $f_{s0}$ is the initial sampling rate of the wideband digital signal. To shift center frequency (foo) of a desired frequency channel close to 0 Hz, the LO frequency is expressed by $f_{c\_shift}$=round($f_{o0}/(f_{s0}/64)$)*($f_{s0}/64$). Accordingly, after the frequency mixing, the new center frequency is moved to $f_{c1}=f_{o0\_shift}-f_{o0}$, which is closer to 0 Hz by within $+/-f_{s0}/64$ range.

Following frequency mixing, decimation in the first stage 602a may be implemented to reduce the sample rate by $M_1$. To be able to handle the high data rate, $M_1$ may be a fixed number (e.g., 8), so that the decimation coefficients are fixed. Effectively, the sampling frequency is reduced from $f_{s0}$ to $f_{s1}=f_{s0}/M_1$.

In some examples, the middle stages (e.g., 602b-602n-1) may perform power of two (2) decimation. In particular, these filters tend to have fewer coefficients and hence reduce the implementation complexity. For ease of design, the frequency mixers used in these stages may be also coarse resolution, but shift the center frequency of the desired frequency band closer to 0 Hz at each stage (or any other desired output center frequency).

Finally, the last stage 602n may perform variable 1 to 2 ratio decimation, such that that the overall decimation reaches $f_{s0}/f_s$, wherein $f_s$ is the target sampling frequency. Since the decimation ratio is small, the number of filter coefficients used is much smaller than one that does large decimation ratio. The frequency mixer used at this stage may have fine resolution, e.g. 1 Hz resolution, so that the center frequency of the desired target frequency bands, after the mixing, is at 0 Hz (or any other desired output center frequency).

In at least one example, the number of decimation stages can be selected having regard to the overall target decimation factor and/or the decimation factor capability of each stage. For example, in at least one example, the design can include four stages. For instance, the first stage 602a may include a fixed decimation by eight. The second and third stages may include programmable (or controllable) decimation, where the decimation factor is power of 2 and is in a range of 1 to 64. The last stage may also have programmable or controllable decimation, where the decimation factor is fractional between 1 and 2. With multiple stages, the overall decimation that can be achieved is in the range of 8 to 65536.

It will be understood herein that other design configurations are possible for the multi-stage DDC 600a. For example, there can be multiple stages of fixed ratio decimation, instead of only one as illustrated. For instance, the first stage may be designed with three stages, where each stage performs fixed decimation by two. There can also be more stages or less stages of power of two decimation stages, for the consideration of factors such as complexity, total filter coefficients, signal to noise ratio, etc.

Figure 6C:
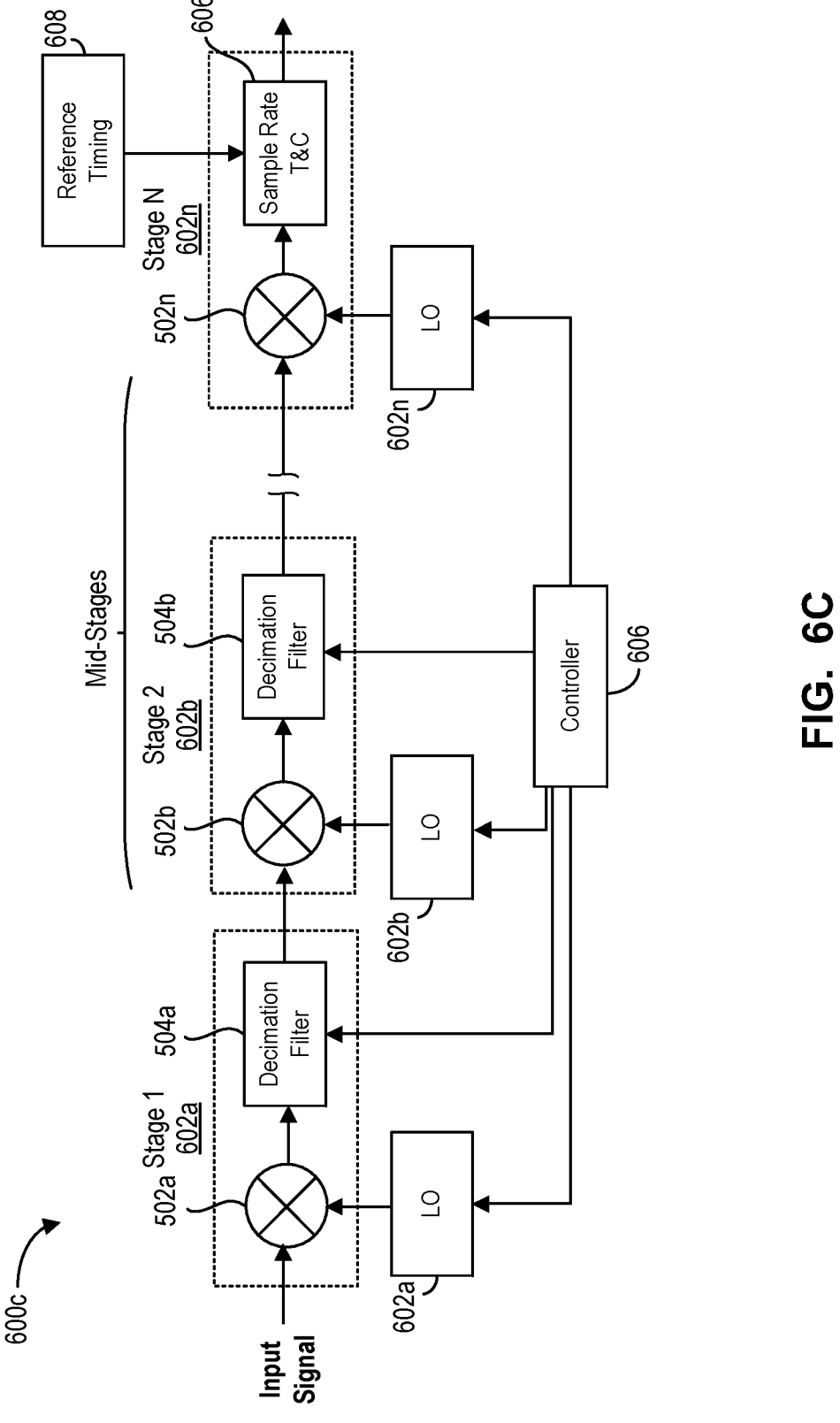
FIG. 6C is a simplified block diagram of another example multi-stage DDC.

Reference is now made to FIG. 6C, which shows another example of a multi-stage DDC 600c. The multi-stage DDC 600c is generally analogous to the multi-stage DDC 600a of FIG. 6A, with the exception that the last stage N 602n includes a sample rate tracker and converter (T&C) 606. The sample rate T&C 606 is configured to track the ratio between the input sample rate (i.e., into stage 1 602a) and the output sample rate of the multi-stage DDC, and to adjust (or fine tune) the sample rate at the last stage to ensure a uniform sample rate aligned with the referencing timing 608 (e.g., based on reference time generator 214).

Figure 7:
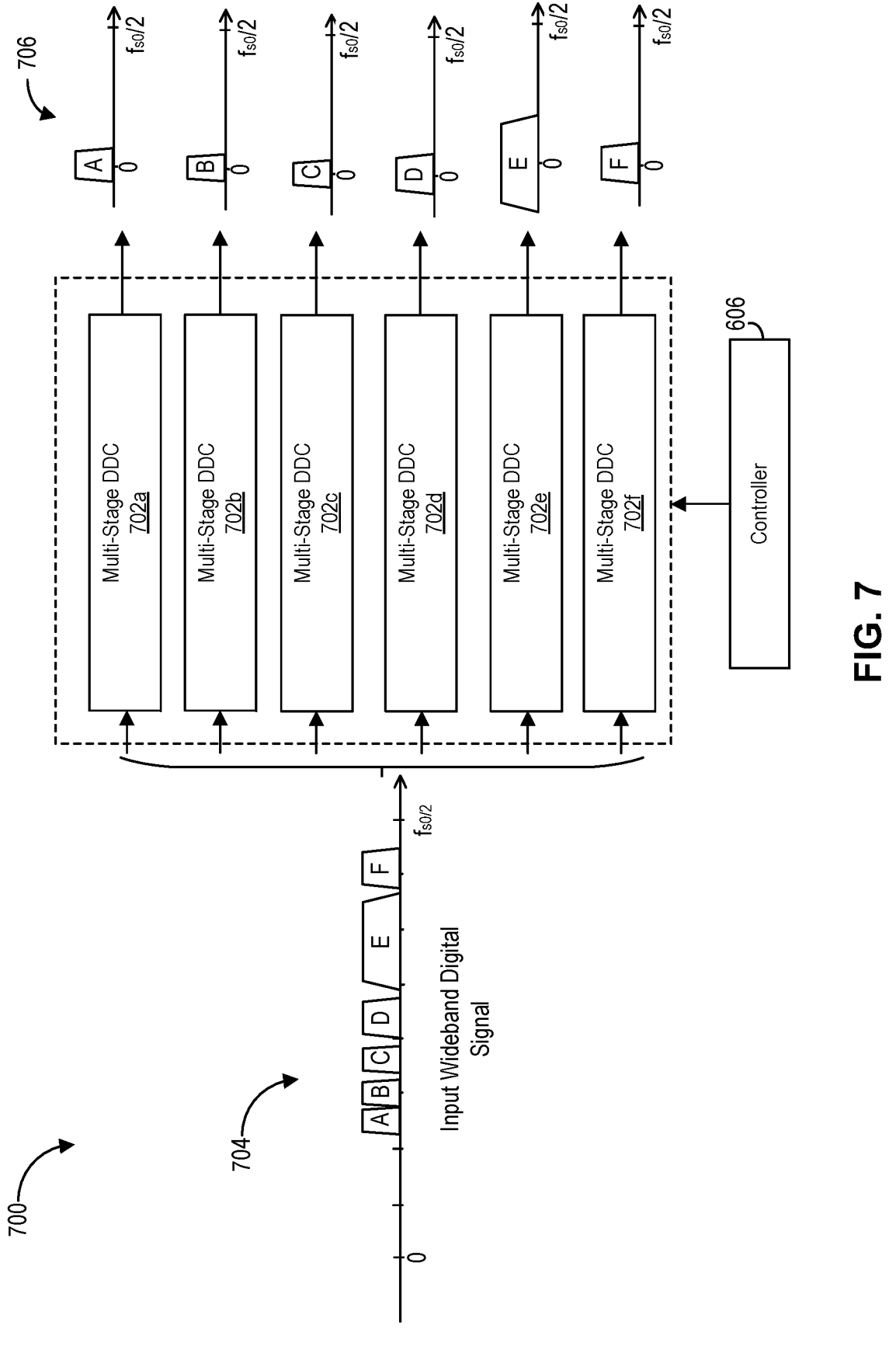
FIG. 7 is a simplified block diagram of an example multi-stage DDC system.

Reference is now made to FIG. 7, which shows a multi-stage DDC system 700 that may include multiple multi-stage DDCs 702a-702f. The multi-stage DDCs 702a-702f may be part of a single WSP 204. For example, as shown in FIG. 3, a single WSP 204 may include multiple DDCs 304a-304n. In other cases, the multi-stage DDCs 702a-702f may be part of separate WSPs 204. Each multi-stage DDC 702a-702f may have an architecture similar to that illustrated in FIG. 6A (multi-stage DDC 600a) and/or FIG. 6C (multi-stage 600c).

As shown, each multi-stage DDC 702 may receive the same input wideband digital signal 704. In some example cases, different multi-stage DDCs 702 may be configured to: (i) filter (or extract) different frequency bands (e.g., frequency channels), and (ii) center shift those target frequency bands to baseband or any other desired center frequency (and further decimate the signals).

For instance, multi-stage DDCs 702a-702f may each be pre-configured (or controllable) to separately filter frequency channels 'A'-'F' and to shift these frequency channels to baseband, respectively. In at least one example, to extract sixty four (64) channels, the system requires sixty four (64) instance of the multi-stage DDCs 702.

Figure 8A:
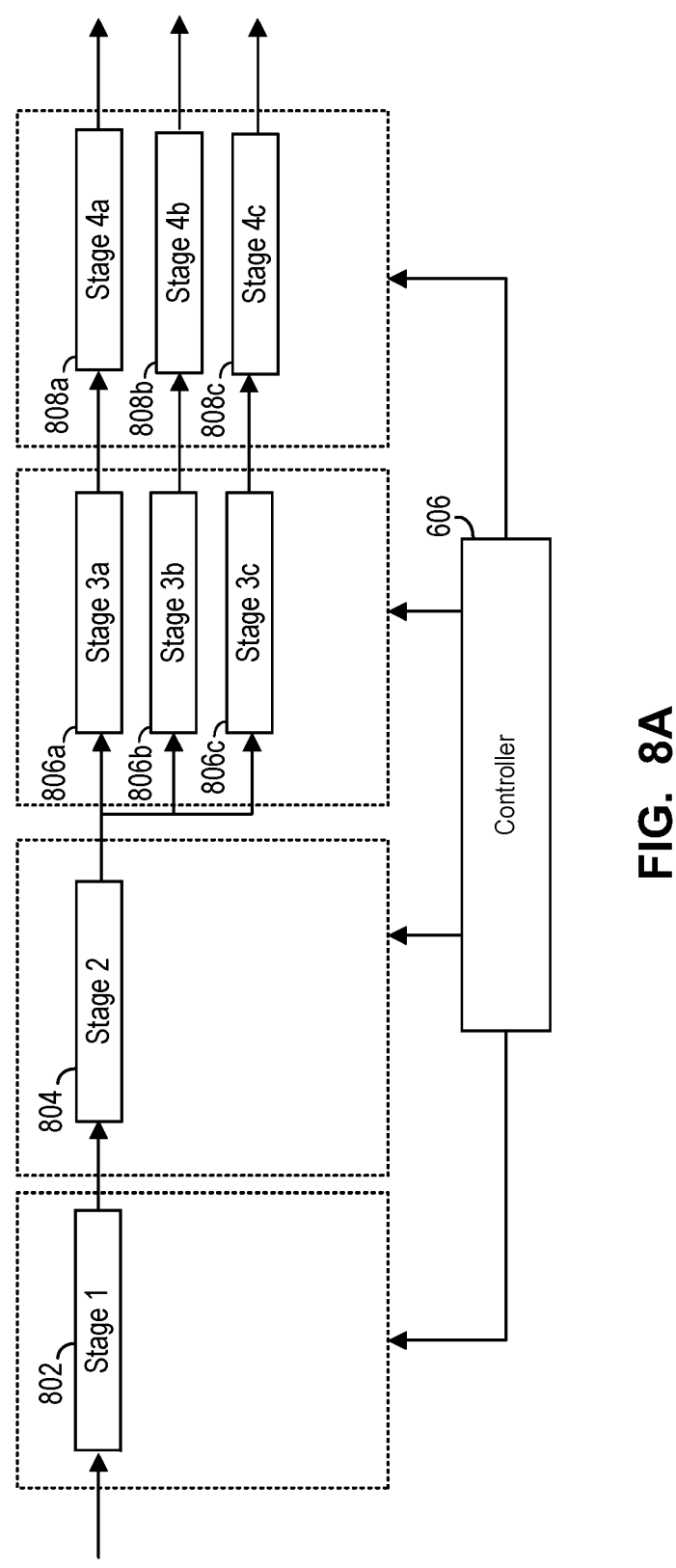
FIG. 8A is a simplified block diagram of another example multi-stage DDC architecture.

Reference is now made to FIG. 8A, which shows another example of a multi-stage DDC 800a. Concurrent reference is also made to FIG. 8B, which provides an illustration of an example mode of operation of the multi-stage DDC 800a in FIG. 8A.

As shown in FIG. 8A, the multi-stage DDC 800a can include a plurality (i.e., two or more) stages arranged in a fan-out network. Each stage 802-808 can include a corresponding frequency mixer 502 and decimation filter 504. The multi-stage DDC 800a may enable filtering (e.g., extracting) of different frequency bands from a single input wideband signal. In some example cases, the multi-stage DDC 800a may provide an alternative architecture to system 700.

Figure 8B:
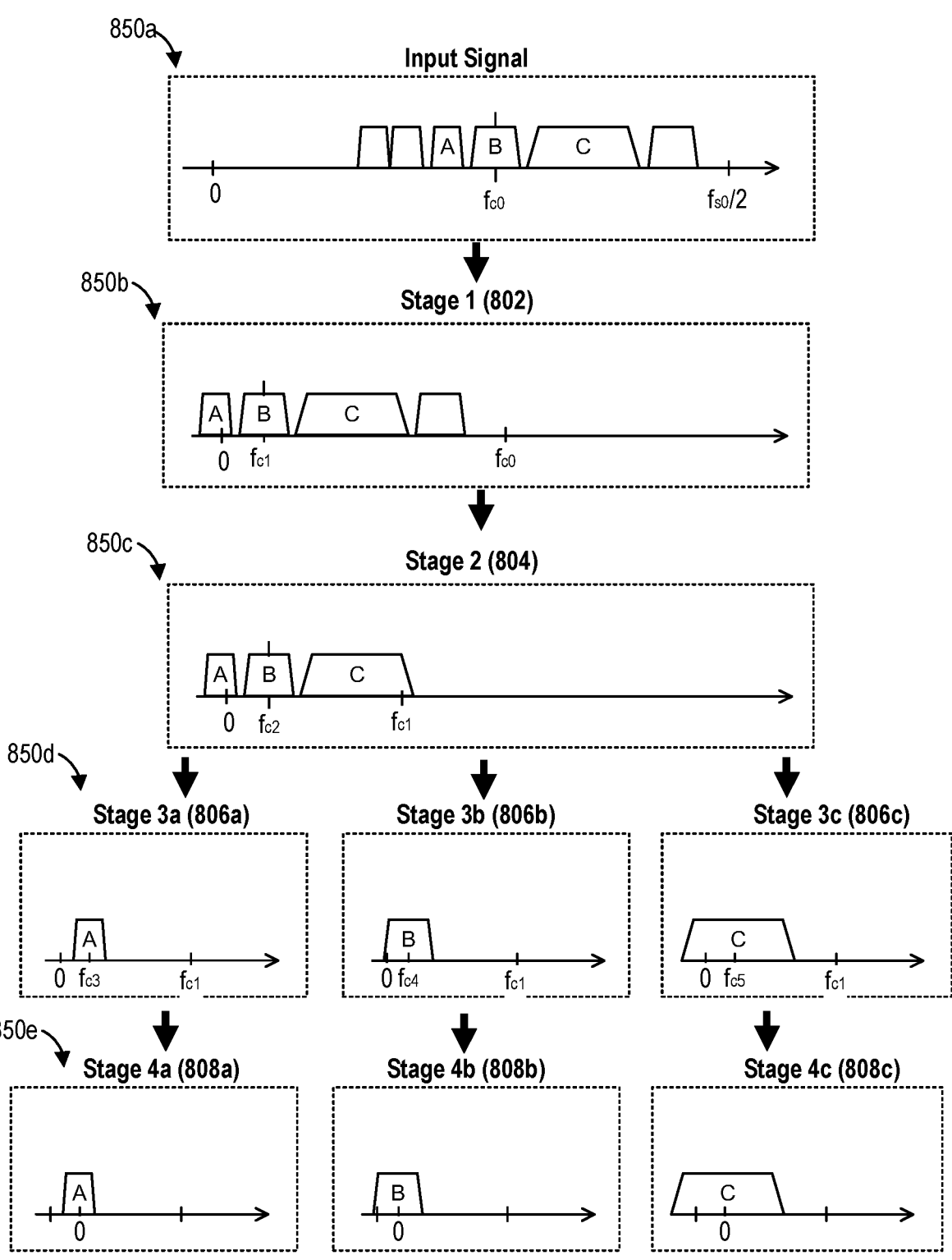
FIG. 8B is an illustration showing an example mode of operation of the multi-stage DDC of FIG. 8A.

As shown, in one example, multi-stage DDC 800a can include a common first stage 802. The first stage 802 can receive an input wideband digital signal 850a (FIG. 8B). It may be desirable, for example, to extract or filter specific frequency bands (e.g., one or more frequency channels 'A'-'C.') which are centered at an initial center frequency ($f_{c0}$). Accordingly, the first stage 802 may initially operate to shift the initial center frequency, of the desired frequency bands, to a shifted frequency ($f_{c1}$), and may further filter and decimate the signal (see e.g., 850b in FIG. 8B).

As shown in FIG. 8A, the common first stage 802 may then feed into one or more second stages 804. In one example, the second stage 804 may again further shift the center frequency ($f_{c2}$), of the target frequency band, closer to baseband (or any other desired center frequency), and may further filter and decimate the input signal (see e.g., 850c in FIG. 8B).

The output of the second stage 804 may fan-out to feed into multiple third stages 806a-806c. In this example, each third stage DDC 806 may separately operate on a separate frequency band desired to be output (e.g., a separate frequency channel CA' to 'C'). For example, as shown in FIG. 8B, the third stage 806a can shift the center frequency of channel CA' to center frequency ($f_{c3}$), and may further filter only channel CA' and decimate the frequency channel. Similarly, the third stages 806b and 806c may further shift the center frequencies of channels CB' and 'C' to respective center frequency ($f_{c4}$) and ($f_{c5}$), and may further filter and decimate only these select frequency signals.

A plurality of fourth stages 808a-808c may couple to third stages 806a-806c, and may further shift the frequencies of each target frequency band (e.g., frequency channel) to baseband and/or may further filter and/or decimate the signals.

Accordingly, by the fourth stage 808—and similar to the system 700—the multi-stage DDC 800a is able to generate multiple outputs corresponding to different frequency channels (see e.g., 850e in FIG. 8B).

Here, it will be understood that the multi-stage architecture in FIG. 8A is only provided by way of non-limiting example. For example, in other cases, the multi-stage DDC 800a may be designed to have any desired number of cascaded fan-out or non-fanned out stages, as required, to accomplish the desired purpose. In at least one example case, the fan-out architecture is realized through the use of various signal switches (e.g., splitters), which can split incident signals to one or more downstream stages. For instance, in the example architecture 800a, the signal splitters may be interposed between stage two 804 and stage three 806. As well, in some examples, any number of DDC stages may be provided (e.g., including multiple first stages 802).

In some example cases, the controller 606 may be provided to variably configure one or more of the stages 802-808.

Figure 9A:
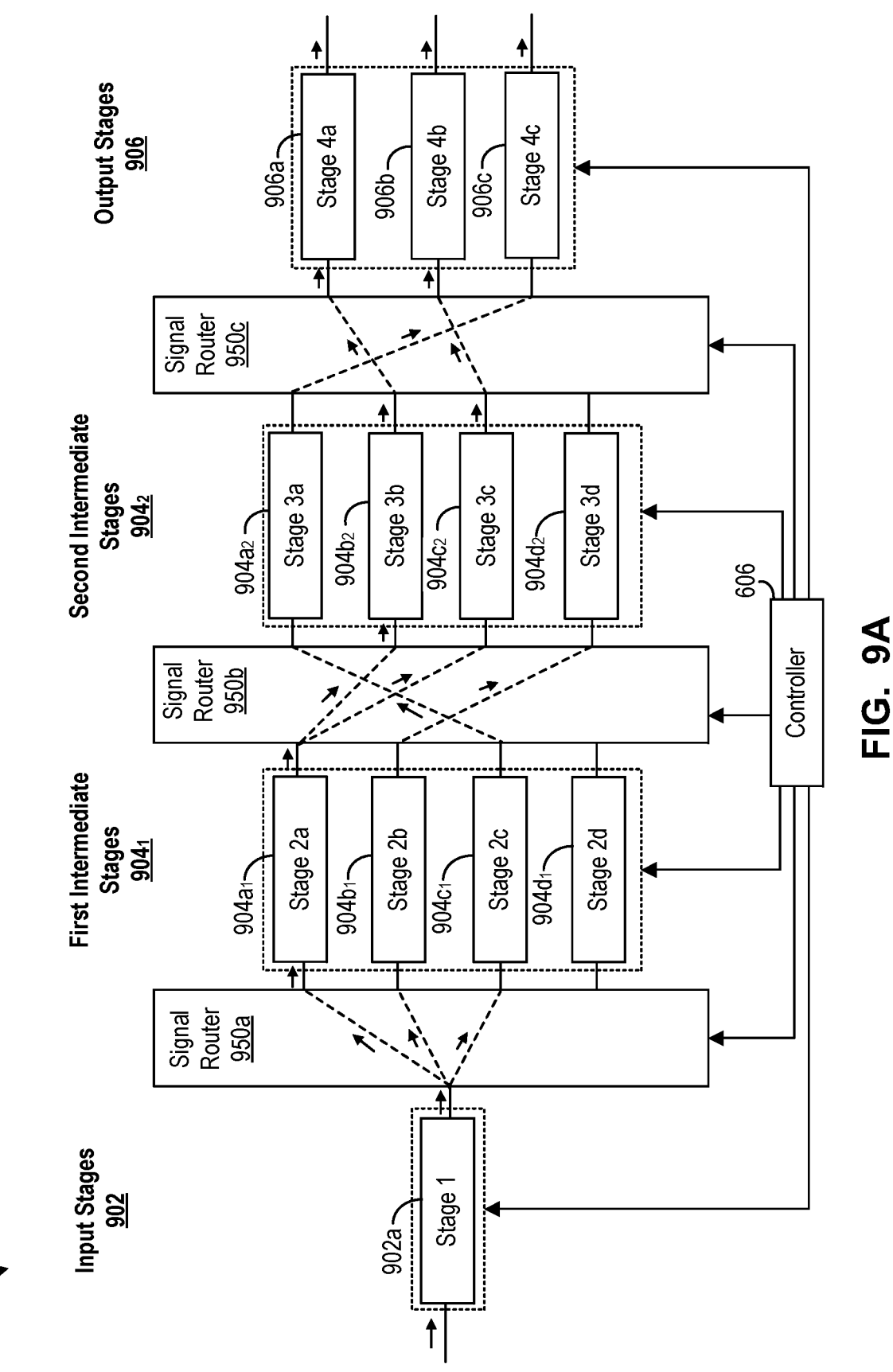
FIG. 9A is a simplified block diagram of still another example multi-stage DDC architecture using signal routers.

Reference is now made to FIG. 9A, which shows another example embodiment for a multi-stage DDC architecture 900a. As contrasted to the linear fan-out architecture exemplified in FIG. 8A, the multi-stage architecture 900a is based on one or more signal routers, which may, for example, be multiplexors or switches.

As shown, the multi-stage DDC 900a can include one or more input stages 902, one or more intermediate stages 904 and one or more output stages 906. One or more signal routers 950a-950c may be positioned between each stage to connect together different stages. For example, a first signal router 950a is positioned between the input stage 902 and a first intermediate stage 904₁. Accordingly, first signal router 950a may direct outputs of the input stage 902a to one or more intermediate DDCs 904a₁-904d₁. Similarly, a second signal router 950b may positioned between first intermediate stage 904₁ and second intermediate stage 904₂. Accordingly, the signal router 950b may direct the output of the first intermediate DDC stages 904a₁ to 904d₁ to one or more second intermediate stages 904a₂-904d₂. Similarly, signal router 950c may be positioned between a second intermediate stage 904₂ and the output stage 906.

In view of the foregoing, the architecture 900a may accomplish an analogous function to the linear cascaded architecture 600a (FIG. 6A) or 600c (FIG. 6C) by routing signals through various stages. Signal routers 950 can also "fan out" input signals to multiple stages to achieve an analogous function to the linear fan-out architecture 800a (FIG. 8A). For example, the signal routers 950 may include embedded signal "splitters", which split and fan-out signals to multiple consecutive stages. The output stages 906 then output the desired or target frequency bands, located at baseband center frequency (or any target center frequency) and at the desired/target sampling rate (e.g., 850e in FIG. 8E).

In the multi-stage DDC architecture 900a, the controller 606 may control the routing configuration of each signal router 950a, 950b. For example, controller 606 may control the switching configuration of each signal router 950 to route signals to the appropriate stage having regard to the frequency bands that require filtering and decimation. Controller 606 may also control the operation and configuration settings of one or more of the stages 902-906. Accordingly, the routing architecture can be used to dynamically and adaptably accommodate different types of input signals, and different desired output requirements, by routing signals flexibly through different DDC stages and configuring those DDC stages.

It will be appreciated that while only three signal routers are illustrated in FIG. 9A, the multi-stage DDC 900a may include any number of signal routers 950 coupling any number of DDC stages.

Figure 9B:
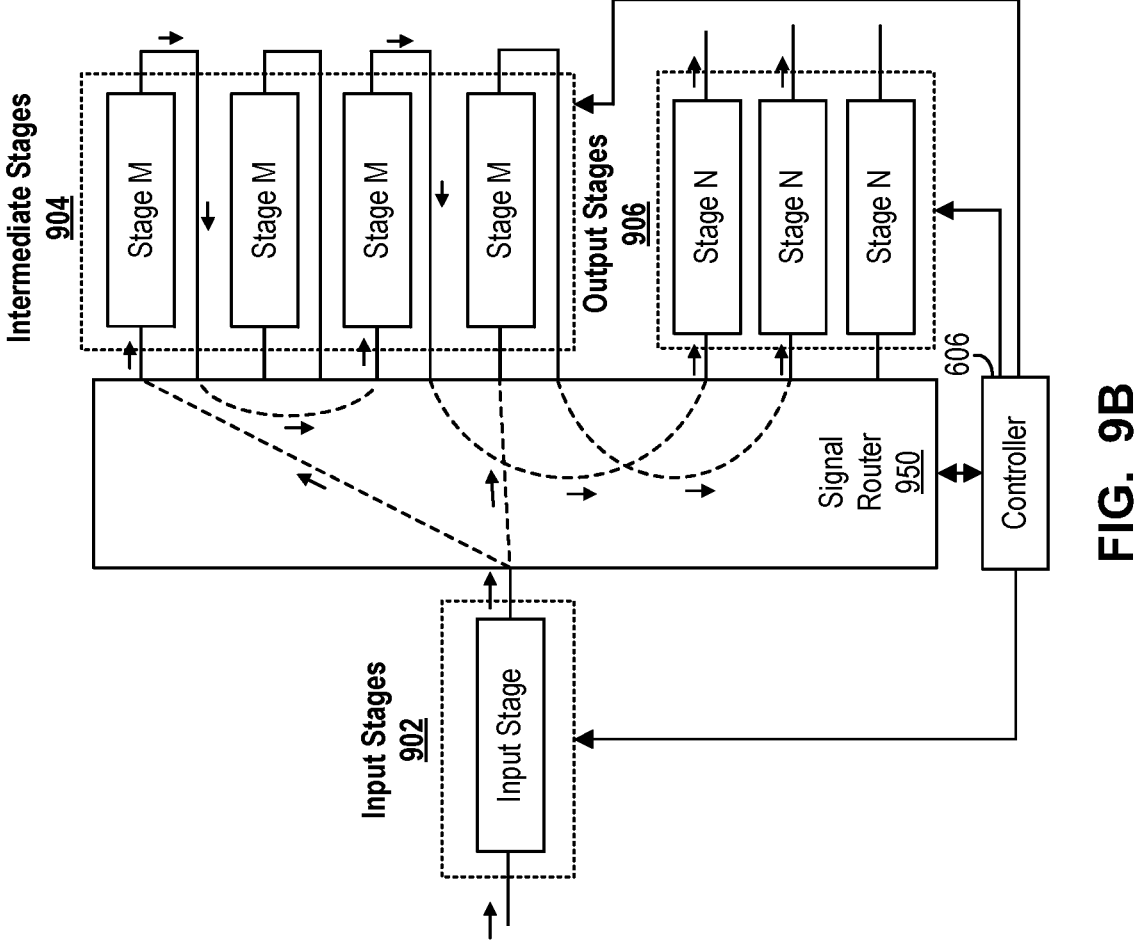
FIG. 9B is a simplified block diagram for another example multi-stage DDC architecture using signal routers.

Reference is now made to FIG. 9B, which shows another example for a multi-stage DDC architecture 900b based on a signal router architecture.

In this example, a consolidated signal router 950 is provided for routing signals between the input stages 902, intermediate stages 904 and output stages 906. For example, the signal router 902 may route a signal between the input stage 902, one or more intermediate stages 904 and through the output stage 906. Accordingly, the signal router 950 may accomplish the combined function of signal routers 950a, 950b in the multi-stage DDC 800a (FIG. 8A).

Figures 10A, 10B:
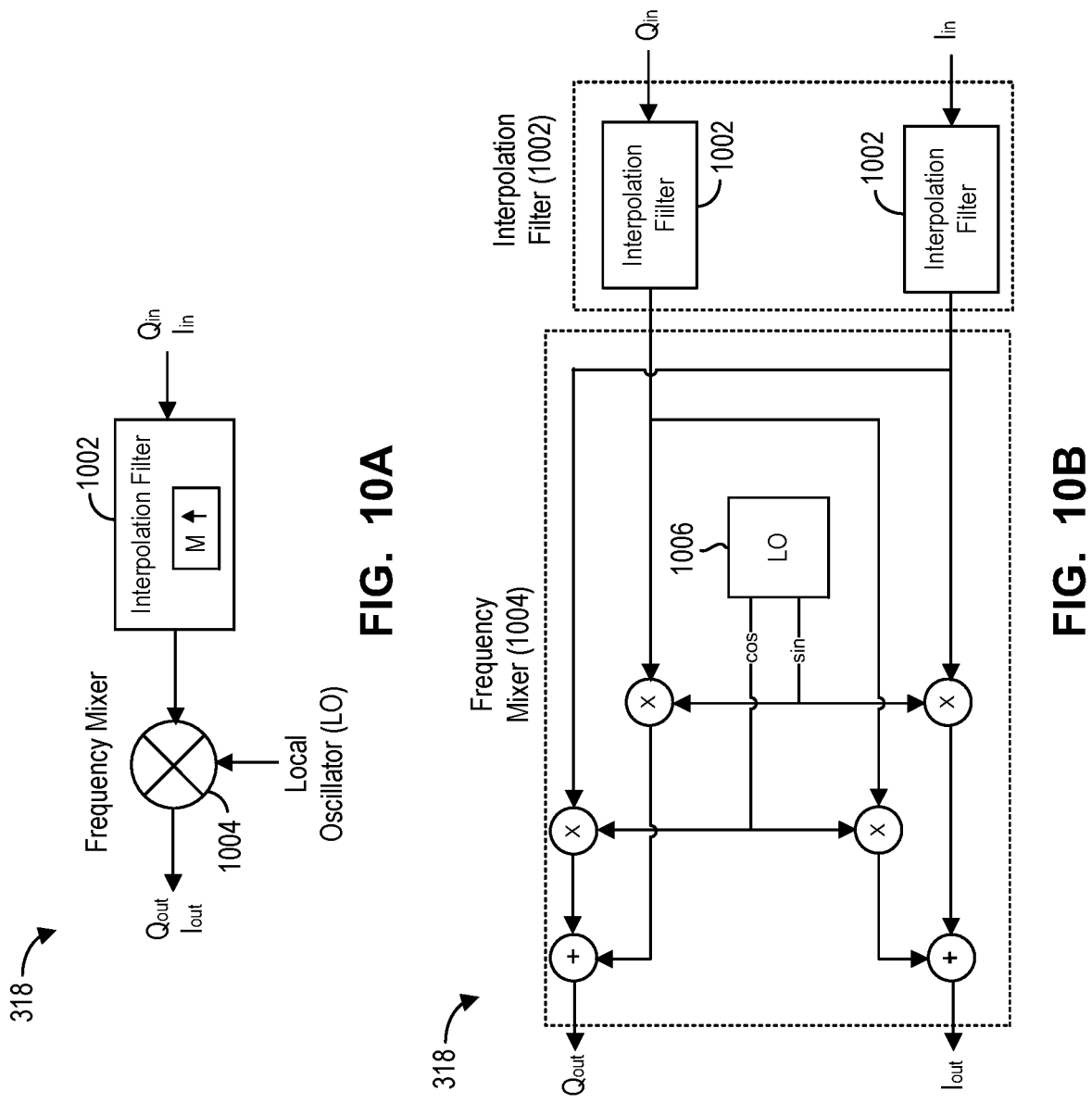
FIG. 10A is a simplified block diagram of an example single-stage digital up-converter (DUC)
FIG. 10B is a simplified block diagram of an example architecture for a single-stage DUC.

Reference is now made to FIGS. 10A and 10B, which show simplified block diagrams of a single-stage digital up-converter (DUC) 318, that may be used in the WSP 204 (FIG. 3).

As shown, the DUC 318 may include an interpolation filter stage 1002 followed by a frequency mixer stage 1004. Interpolation filter 1002 can be used to up-sample incoming in-phase and quadrature signals ($I_{in}/Q_{in}$) to increase the sampling frequency to a higher sampling frequency. The interpolation filter may also include a lowpass filter (e.g., LPF FIR) to remove "images" generated by the up-sampling (i.e., an anti-imaging filter).

The frequency mixer 1004 may receive the up-sampled signals, and may further shift-up the center frequency, e.g., from baseband to an intermediate frequency (IF). For example, this may be performed to facilitate transmission of the signal. For example, in FIG. 4, this may involve shifting the frequency of channel CD' from baseband (400c) back to a target center frequency ($f_{c0}$) (400b).

Similar to the single-stage DDC in FIG. 5A, it has been appreciated that there are a number of drawbacks inherent in a single-stage DUC architecture as shown in FIGS. and 10B. For example, it may be impractical for a single interpolation filter 1002 to provide sufficient up-sampling of the incoming signal (e.g., an up-sampling ratio of greater than 9,000). Further, it is often extremely difficult to design a local oscillator (e.g., NCO 1006) with sufficiently fine resolution to shift the center frequency by the desired amount, and over a large frequency bandwidth.

Figure 11A:
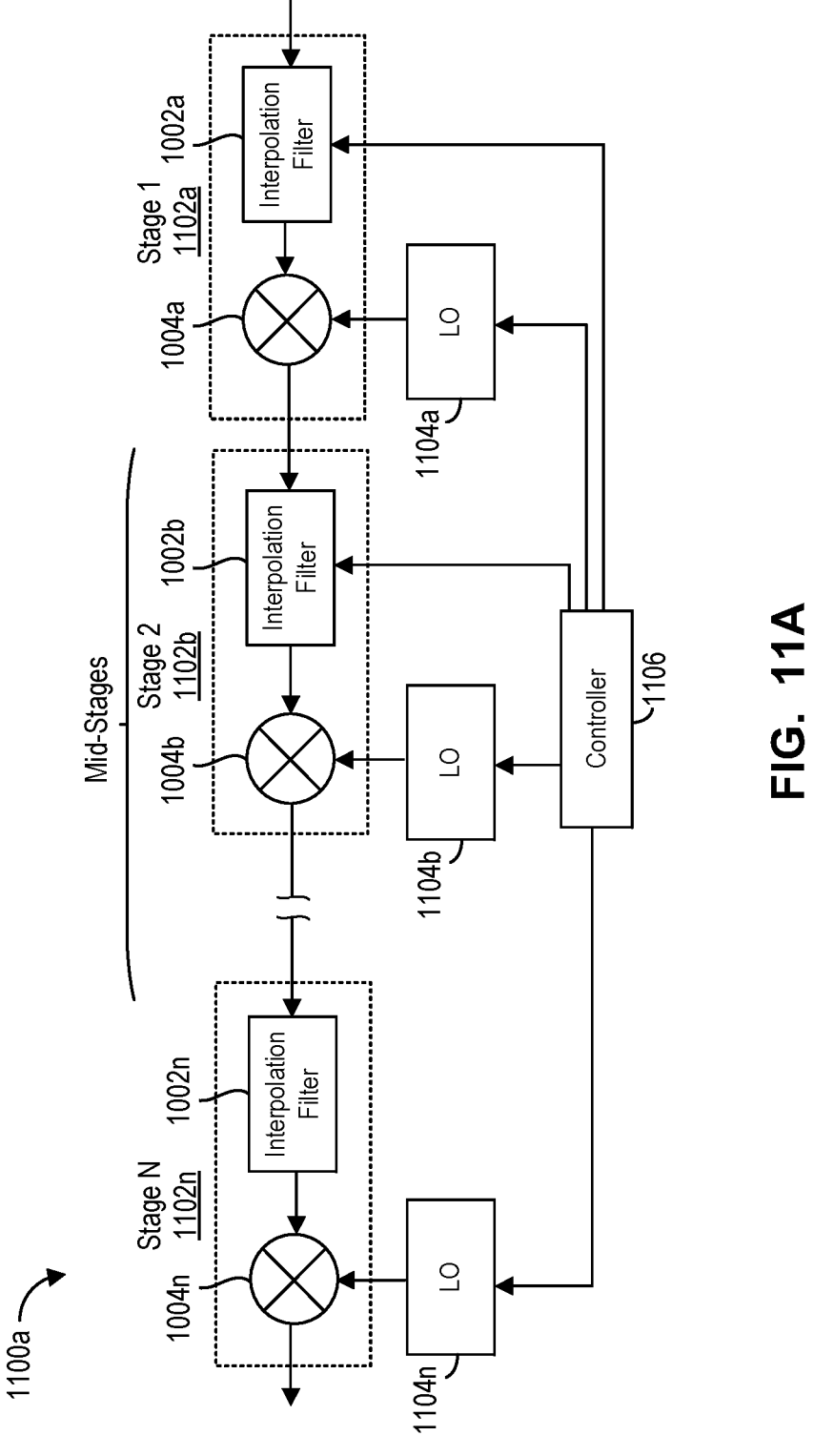
FIG. 11A is a simplified block diagram of an example multi-stage DUC.

Reference is now made to FIG. 11A, which shows a simplified block diagram for an example embodiment for a multi-stage DUC 1100a.

As shown, analogous to the multi-stage DDC 600a, the multi-stage DUC 1100a includes multiple stages 1102a-1102n cascaded in series. Each stage 1102 includes a respective interpolation filter 1002 and frequency mixer 1004. As the DDC is processing digital signals, the local oscillators 1104 may be numerically-controlled oscillators (NCO).

Each DUC stage 1102 performs a portion of the desired up-sampling and shifting-up of the center frequency of a received frequency band. Accordingly, the aggregate of all DUC stages achieves the desired up-sampling and target frequency shifting. The multi-stage DUC 1100a accordingly segments (or distributes) the up-sampling and frequency mixing over multiple stages. In turn, this reduces the requirement on each individual stage. For example, it is not required that any one stage perform large up-sampling, or perform frequency mixing to effect precise shifts to a desired target center frequency.

To this end, each of the DUC stages may be either a fixed stage or a variable stage. In a variable stage, controller 1106 is coupled to the interpolation filter 1002 to vary their respective configuration settings, as explained previously. In either stage, the controller 1106 may be coupled to the local oscillator 1104 to adjust its tuning frequency.

In view of the foregoing, it can be said that each DUC stage may include: (i) one or more interpolation filters 1002, each which performs stage-specific frequency up-sampling. For example, the interpolation filter 1002 can adjust a first input sampling frequency—associated with the input signal(s) into that stage—to a second target sampling frequency. The second sampling frequency may be equal to, or greater than, the first sampling frequency. The difference between the first and second sampling frequency may be referred to herein as the stage-specific up-sampling difference. Each interpolation filter 1002 can also include a corresponding LPF. The controller may be operable to adjust the stage-specific up-sampling difference, as well as a configuration of the interpolation filter (e.g., passband, etc.); and/or (ii) one or more frequency-mixers 1004, each which is tuned to a given center frequency, and is configured to shift that center frequency from a first center frequency to a second stage-specific shifted center frequency, whereby the second center frequency is equal to, or greater, than the first center frequency. The difference between the first and second center frequencies may be referred herein as a stage-specific frequency upshift difference. The controller may be operable to adjust and control the tuning center frequency, as well as the frequency upshift difference.

In this manner, input signal(s) are received into the multi-stage DUC 1100a having an initial bandwidth, an initial sampling frequency and an initial center frequency, and the aggregate of all stages may generate one or more corresponding output signal(s) having a target bandwidth, target sampling frequency and a target center frequency. At least the target sampling frequency and target center frequency may be each equal to, or greater than, the input sampling frequency and input center frequency, respectively.

Figure 11B:
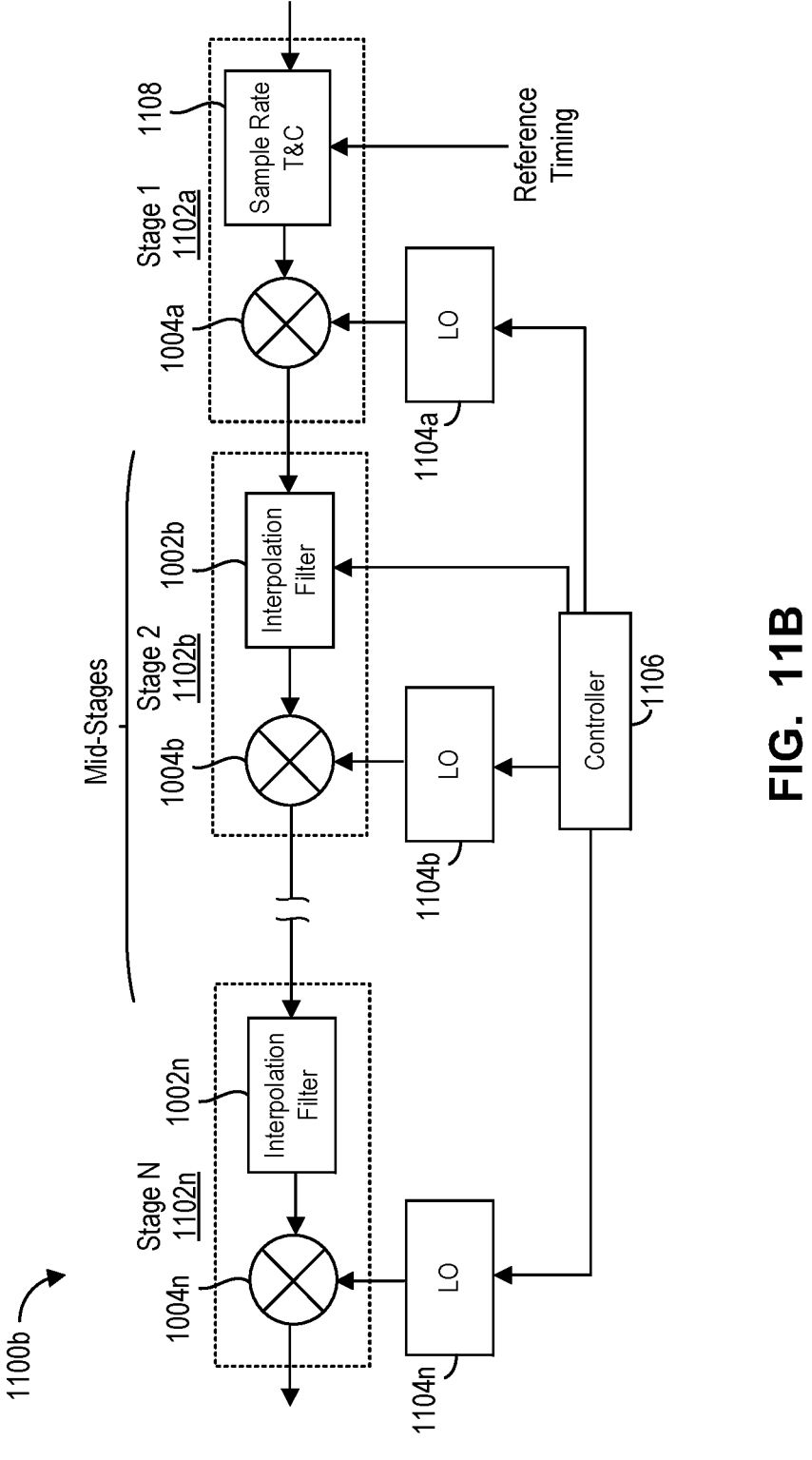
FIG. 11B is a simplified block diagram of another example multi-stage DUC.

Reference is now made to FIG. 11B, which shows a simplified block diagram for another example of a multi-stage DUC 1100b.

The multi-stage DUC 1100b is generally analogous to the multi-stage DUC 1100a of FIG. 11A, with the exception that the first stage includes a sample rate tracker and converter 1108. The sample rate tracker and converter can ensure a uniform and consistent sample rate output that is locked to the reference timing. In some embodiments, the first stage may include programmable or controllable interpolation, where, for example, the up-sampling ratio may be fractional between 1 and 2.

Figure 12:
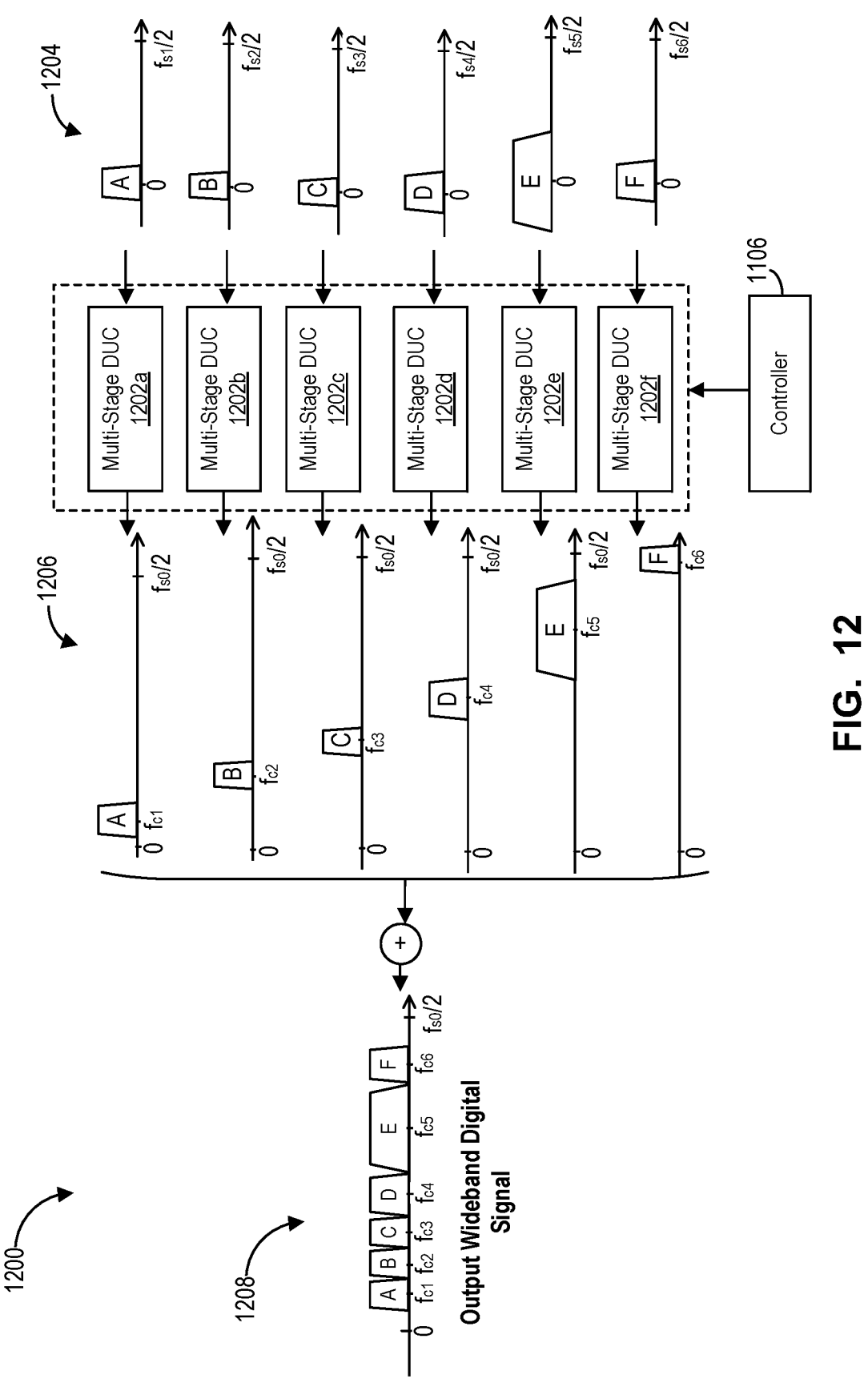
FIG. 12 is a simplified block diagram of an example multi-stage DUC system.

Reference is now made to FIG. 12, which shows a multi-stage DUC system 1200 that may include multiple multi-stage DUCs 1202a-1202f. The multi-stage DUCs 1202a-1202f may be part of a single WSP 204. For example, as shown in FIG. 3, a single WSP 204 may include multiple DUCs 318a-318n. In other cases, the multi-stage DUCs 1202a-1202f may be part of separate WSPs 204. Each multi-stage DUC 1202 may have an architecture similar to that illustrated in FIG. 11A (multi-stage DDC 1100a) and/or FIG. 11B (multi-stage 1100b).

As shown, each multi-stage DUC 1202 may receive a respective narrow frequency band signal 1204 (e.g., corresponding to a single frequency channel). In some example cases, each received narrowband signal 1204 is a baseband signal, having a center frequency ($f_c$) around 0 Hz, and having a respective sampling rate ($f_{s1}$ to $f_{s6}$).

In this example system, each multi-stage DUC 1202 operates to increase the sampling frequency of the received narrowband signal to a standard sampling frequency ($f_{s0}$), as well as shift-up the center frequency to a respective target center frequency ($f_{c1}$ to $f_{c6}$). The outputs, of each multi-stage DUC 1202a-1202f, may then be summed together to generate the wideband output digital signal 1208.

In at least one example, to generate a wideband output signal 1208 having sixty four (64) channels, the system requires sixty four (64) instances of multi-stage DUCs 1202.

Figure 13A:
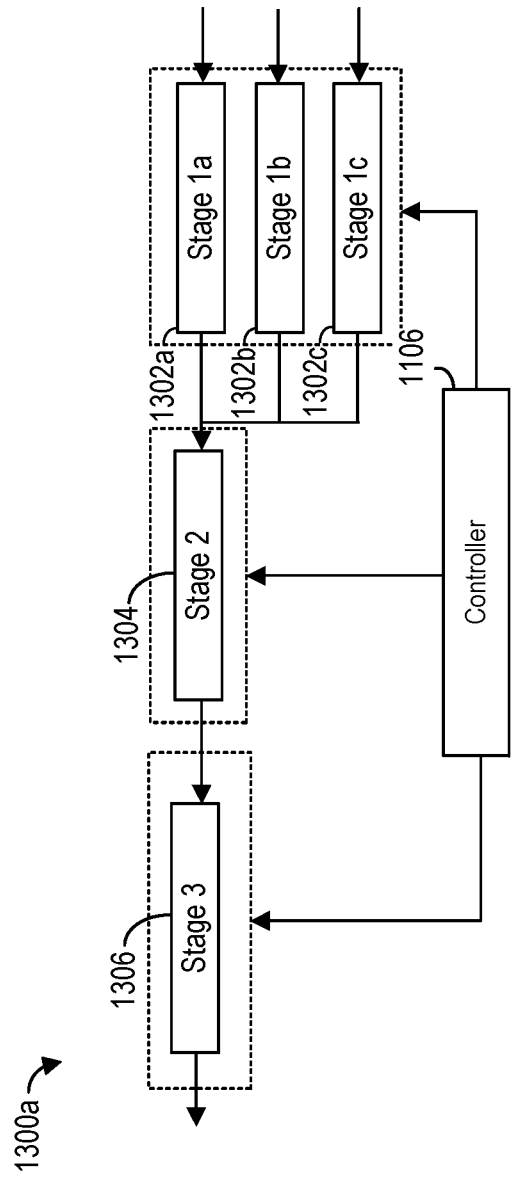
FIG. 13A is a simplified block diagram of another example multi-stage DUC.

Reference is now made to FIG. 13A, which shows another example of a multi-stage DUC 1300a. Concurrent reference is also made to FIG. 13B, which provides an illustration of an example mode of operation of the multi-stage DUC 1300b in FIG. 13B.

As shown in FIG. 13A, the multi-stage DUC 1300a can include a plurality of stages (i.e., two or more) arranged in a fan-in network. Each stage 1302-1308 can include a corresponding interpolation filter and frequency mixer. The multi-stage DUC 1300a may enable generating a wideband sub-band digital signal comprised of multiple frequency bands (e.g., frequency channels). In some example cases, multi-stage DUC 1300a may provide an alternative architecture to system 1200.

Figure 13B:
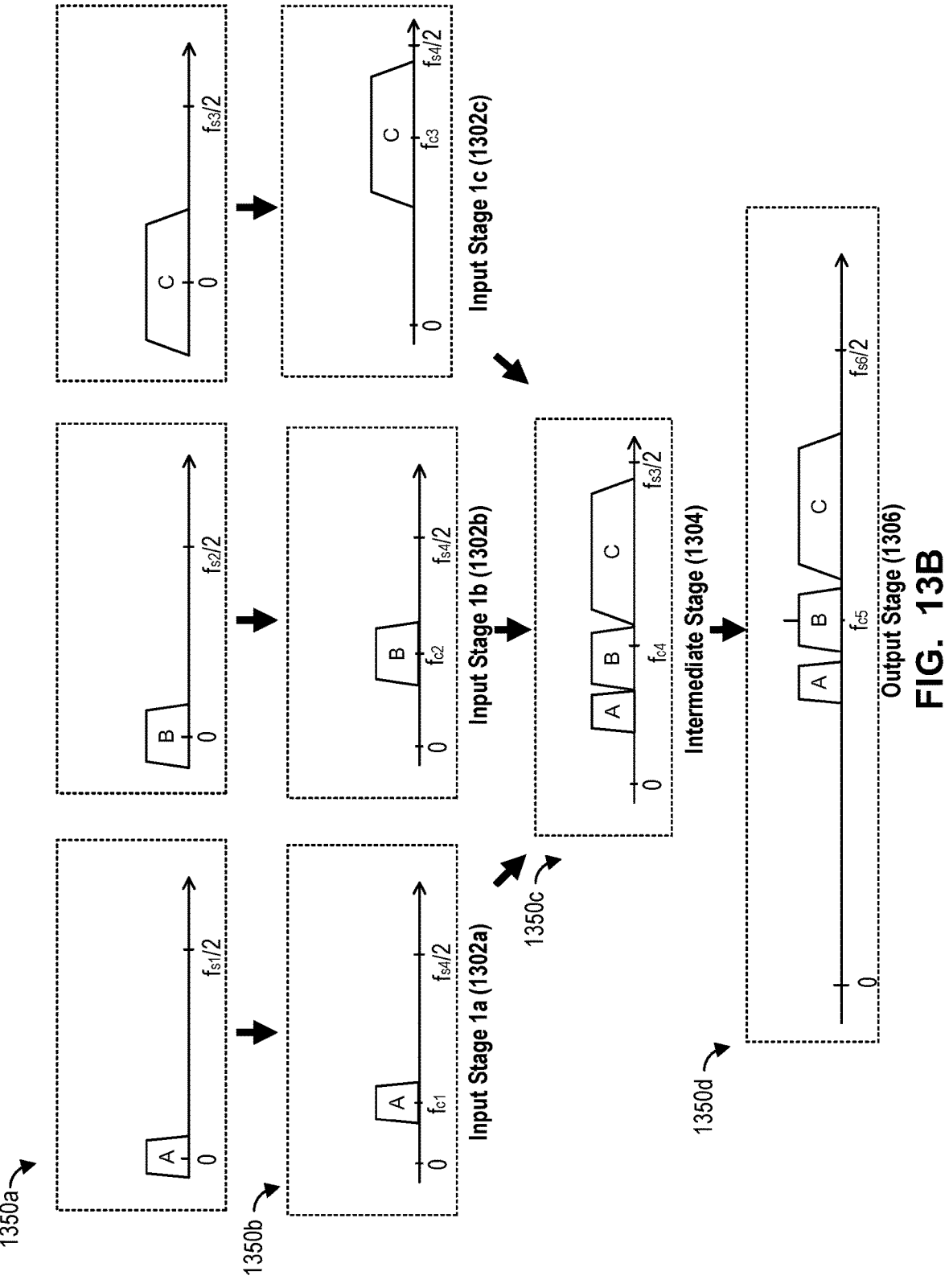
FIG. 13B is an illustration of an example mode of operation for the multi-stage DUC in FIG. 13A.

In the illustrated example, multi-stage DUC 1300a can include one or more first stages 1302a-1302c. As shown in FIG. 13B, each first stage 1302a-1302c can, for example, receive a separate frequency band (e.g., frequency channel) (see e.g., 1350a in FIG. 13B). Each frequency channel can be initially located at baseband (e.g., zero center frequency) and may have an associated sample rate ($f_{s1}$ to $f_{s3}$). Accordingly, in this example, each first stage 1302 may apply a respective interpolation filter and frequency shift to generate an up-sampled and frequency shifted version of the received input signal (see e.g., 1350b in FIG. 13B). In this example, each first stage may up-sample the respective input signal to a common sample frequency ($f_{s4}$).

The outputs of each of first stage may feed, for example, into a common second stage 1304. As shown in 1350c in FIG. 13B, the second stage may aggregate or combine the multiple frequency bands into a single wideband frequency signal. In some cases, the combining or aggregating may occur prior to the signal being received at the common second stage 1304 (e.g., using a signal combiner). The second stage 1304 may then up-sample the aggregate wideband signal to a sampling frequency ($f_{s5}$). The higher sampling frequency may be closer to the desired final sampling frequency. The second stage 1304 may also shift the center frequency to a center frequency ($f_{c6}$), which is also closer to the desired final center frequency (e.g., corresponding to an intermediate frequency).

Finally, the last stage 1306 (FIG. 13A) may, for example, again increase the sampling frequency of the wideband signal to a final desired sampling frequency ($f_{s6}$), and may also shift the center frequency to a desired center frequency ($f_{c5}$).

Accordingly, similar to the system 1200, the multi-stage DDC 1300a is able to generate a single wideband sub-band digital frequency output from one or more individual received frequency bands (e.g., channels).

Here, it will be understood that the multi-stage architecture in FIG. 13A is only provided by way of non-limiting example, and that a multi-stage DUC 1300a may be designed having any desired number of cascaded fan-in or non-fanned in stages, as required, to accomplish an analogous functional purpose.

Figure 14A:
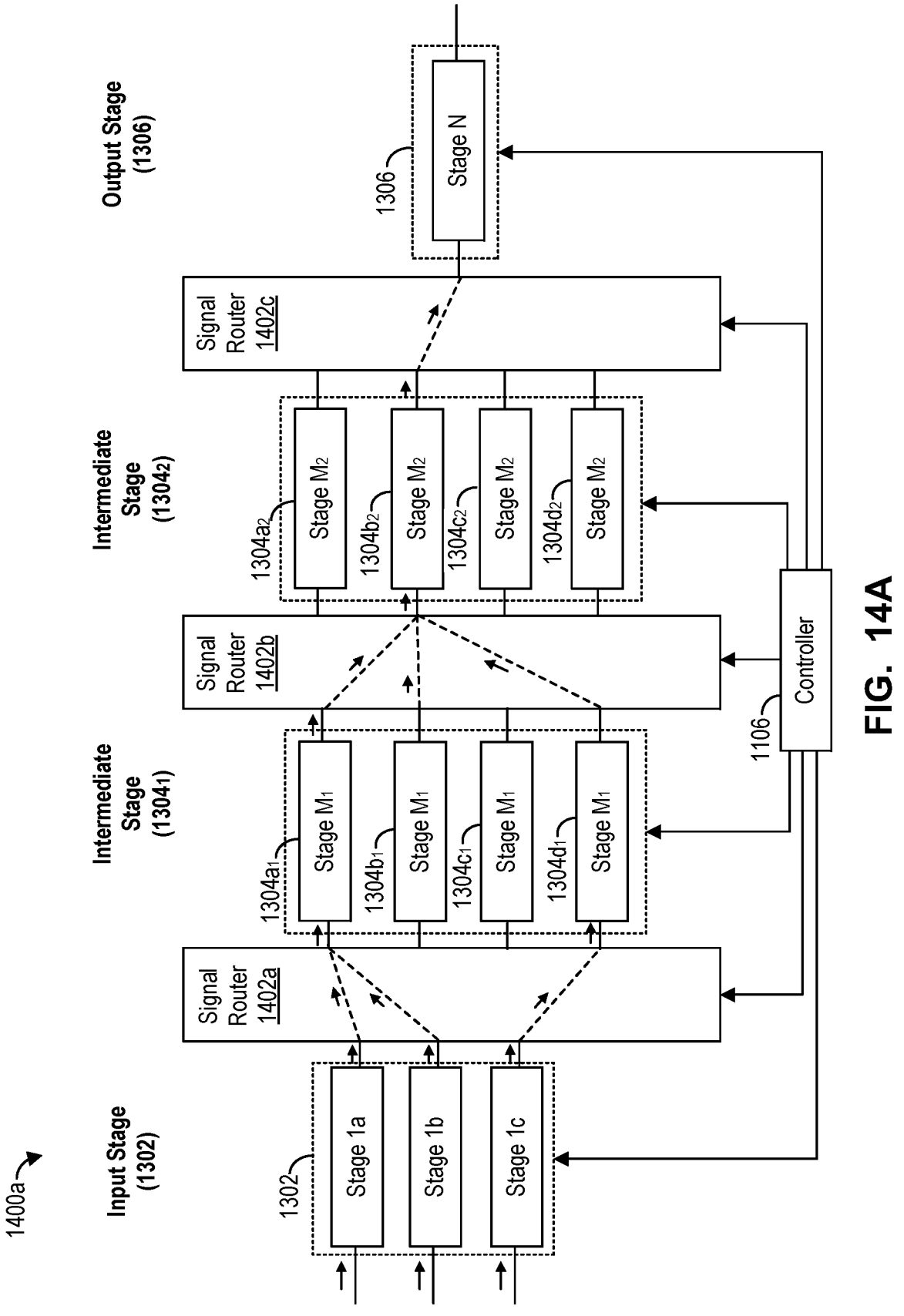
FIG. 14A is a simplified block diagram for still another example multi-stage DUC architecture using signal routers.

Reference is now made to FIG. 14A, which shows another example embodiment for a multi-stage DUC architecture 1400a. As contrasted to the linear fan-in architecture exemplified in FIG. 13A, the multi-stage architecture 1400a is based on one or more signal routers.

As shown, the multi-stage DUC 1400a can include one or more input stages 1302, one or more intermediate stages 1304 and one or more output stages 1306. One or more signal routers 1402a-1404c may be positioned between each stage to connect different stages together. For example, a first signal router 1402a is positioned between the input stage 1302 and a first intermediate stage 1304_1. Accordingly, first signal router 1402a may direct outputs of the input stage 1302a to one or more intermediate stage DUCs 1304_1-1304d_1. Similarly, a second signal router 1402b may positioned between first intermediate stage 1304_1 and second intermediate stage 13042. Accordingly, the signal router 1402b may direct the output of the first intermediate DUC stages 1302a_1-1302d_1 to one or more second intermediate stages 1304a_2-1304d_2. Similarly, signal router 1402c may be positioned between a second intermediate stage 14022 and the output stage 1306.

Accordingly, the signal router architecture 1400a may accomplish an analogous function to the linear cascaded architecture 1100a (FIG. 11A) or 1100b (FIG. 11B) by routing signals through the various stages. Signal routers 1402a-1402c can also "fan-in" (e.g., combine) input signals, and feed the aggregate signals through multiple stages to achieve an analogous function to the linear fan-in architecture 1200 (FIG. 12).

In the multi-stage DUC architecture 1400a, the controller 1106 may control the routing configuration of each signal router 1402a, 1402b. For example, controller 1106 may control the switching configuration of each signal router 1402a, 1402b to route signals to the appropriate stage having regard to the frequency bands that require aggregation. Controller 1106 may also control the operation and configuration settings of one or more of the stages 1302-1306.

It will be appreciated that while only three signal routers are illustrated in FIG. 14A, the multi-stage DUC 1400a may include any number of signal routers 1402 coupling any number of DUC stages.

Figure 14B:
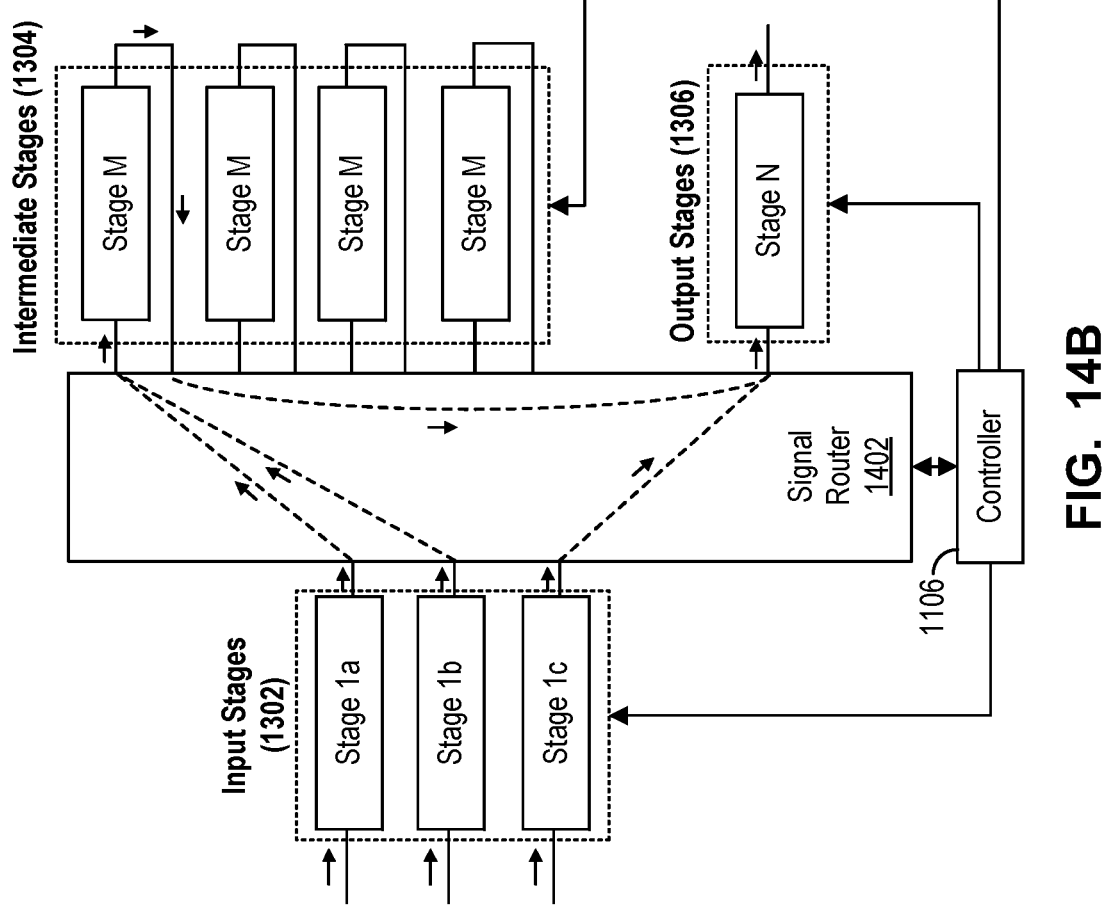
FIG. 14B is a simplified block diagram for another example multi-stage DUC architecture using signal routers.

Reference is now made to FIG. 14B, which shows another example for a multi-stage DDC architecture 1400b based on a signal router architecture.

In this example, a consolidated signal router 1402 is provided for routing signals between the input stages 1302, intermediate stages 1304 and output stages 1306. For example, the signal router 1402 may route a signal between the input stage 1302, one or more intermediate stages 1304 and through the output stage 1306. Accordingly, the signal router 1402 may accomplish the combined function of signal routers 1402a-1402c in the multi-stage DUC 1400a (FIG. 14A).

While the multi-stage DDCs and DUCs have been explained herein with reference to an example application involving WSPs, it will be understood that the multi-stage DDCs and DUCs can be provided as stand-alone devices and systems and/or incorporated into any other desired devices and/or systems.

As used herein, the controllers (e.g., controller 250, 606, 1106, etc.) may each comprise one or more processors. The one or more processors may be computer processors, such as a general purpose microprocessors. In some other cases, the one or more processors may be a field programmable gate arrays, application specific integrated circuits, microcontrollers, or other suitable computer processors.

The one or more processors may be coupled, via a computer data bus, to a memory. Memory may include both volatile and non-volatile memory. Non-volatile memory stores computer programs consisting of computer-executable instructions, which may be loaded into volatile memory for execution by processor as needed. It will be understood by those of skill in the art that references herein to a controller as carrying out a function or acting in a particular way imply that the one or more processors are executing instructions (e.g., a software program) stored in memory and possibly transmitting or receiving inputs and outputs via one or more interface. Memory may also store data input to, or output from, the one or more processors in the course of executing the computer-executable instructions.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A multi-stage digital down converter (DDC) comprising:

a plurality of receiving stages, including a first receiving stage for receiving an input signal, a plurality of last receiving stages wherein each of the plurality of receiving stages is for transmitting a respective output signal, and one or more mid-receiving stages coupled in series between the first receiving stage and each of the last receiving stages in a fan-out architecture having a plurality of receiving signal paths, wherein:

each of the receiving stages has a decimation filter having a corresponding receiving stage decimation ratio to progressively decimate the sampling rate of the input signal;

at least one of the receiving stages has a controllable receiving stage decimation ratio; and each receiving signal path extending from the first receiving stage to one of the last receiving stages, and wherein each receiving signal path has a selected overall decimation ratio corresponding to the receiving stage decimation ratios of the receiving stages in that receiving signal path; and a controller coupled to each of the receiving stages having a controllable decimation ratio to control an overall decimation ratio of the DDC.

2. The DDC of claim 1 further comprising at least one router for coupling at least some of the receiving stages to one another in series, wherein the controller is coupled to the router to control the coupling of the receiving stages.

3. The DDC of claim 1 wherein the decimation filter of one of the receiving stages includes a sample rate tracker to track the sample rate of the input signal and the sample rate of the respective output signal and to adjust the receiving stage decimation ratio of the corresponding receiving stage to produce the respective output signal with a uniform sample rate.

4. The DDC of claim 1 wherein the first receiving stage has a fixed receiving stage decimation ratio, at least some of the mid-receiving stages have variable integer stage decimation ratios and the plurality of last receiving stages have a controllable receiving stage decimation ratio.

5. The DDC of claim 1 wherein the first receiving stage has a fixed receiving stage decimation ratio, at least some of the mid-receiving stages have variable power of two stage decimation ratios and the plurality of last receiving stages have a controllable receiving stage decimation ratio between one and two.

6. The DDC of claim 1 wherein at least some of the receiving stages include a frequency mixer having a respective receiving stage center frequency to downshift the input signal, and wherein the combined downshifting effect of the frequency mixers in the series path from the first receiving stage to the plurality of last receiving stages is to lower the center frequency of a selected frequency band to baseband.

7. The DDC of claim 6 wherein the center frequency of at least some of the receiving stages is controllable and the controller is coupled to the receiving stages having a controllable center frequency to control the combined downshifting effect of the frequency mixers.

8. The DDC of claim 6 wherein the first receiving stage provides coarse resolution frequency mixing, at least some of the mid-receiving stages provide coarse resolution frequency mixing and the plurality of last receiving stages have a controllable center frequency to provide fine resolution frequency mixing.

9. The DDC of claim 1 wherein at least some of the receiving stages in each receiving signal path include a frequency mixer having a respective receiving stage center frequency, and wherein the combined downshifting effect of the frequency mixers in each receiving signal path from the first receiving stage to the corresponding last stage is to lower the center frequency of a corresponding selected frequency band to baseband.

10. A multi-stage digital up converter (DUC) comprising:

a plurality of transmitting stages, including a plurality of first transmitting stages wherein each of the first transmitting stages is for receiving a respective input signal, a last transmitting stage for transmitting an output signal, and one or more mid-transmitting stages coupled in series between each of the first transmitting stages and the last transmitting stage in a fan-in architecture having a plurality of transmitting signal paths, wherein:

each of the transmitting stages has an interpolation filter having a corresponding transmitting stage up-sampling ratio to progressively up-sample the sampling rate of the respective input signal;

at least one of the transmitting stages has a controllable transmitting stage interpolation ratio; and each transmitting signal path extending from one of the first transmitting stages to the last transmitting stage, and wherein each transmitting signal path has a selected overall up-sampling ratio corresponding to the transmitting stage up-sampling ratios of the transmitting stages in that transmitting signal path; and a controller coupled to each of the transmitting stages having a controllable transmitting stage up-sampling ratio to control an overall up-sampling ratio of the DUC.

11. The DUC of claim 10 further comprising at least one router for coupling at least some of the transmitting stages to one another in series, wherein the controller is coupled to the router to control the coupling of the transmitting stages.

12. The DUC of claim 10 wherein the interpolation filter of one of the transmitting stages includes a sample rate tracker to track the sample rate of the output signal and to adjust the transmitting stage up-sampling ratio of the corresponding transmitting stage to produce an output signal with a uniform sample rate.

13. The DUC of claim 10 wherein the last transmitting stage has a fixed transmitting stage up-sampling ratio and the plurality of first transmitting stages has a controllable transmitting stage up-sampling ratio.

14. The DUC of claim 10 wherein the last transmitting stage has a fixed transmitting stage up-sampling ratio, and the plurality of first transmitting stages have a controllable transmitting stage up-sampling ratio between one and two.

15. The DUC of claim 10 wherein at least some of the transmitting stages include a frequency mixer having a respective transmitting stage center frequency to upshift the center frequency of the input signal, and wherein the combined upshifting effect of the frequency mixers in the series path from the first transmitting stage to the last transmitting stage is to upshift the center frequency of the input signal to a selected center frequency.

16. The DUC of claim 15 wherein the center frequency of at least some of the transmitting stages is controllable and the controller is coupled to the transmitting stages having a controllable center frequency to control the combined upshifting effect of the frequency mixers.

17. The DUC of claim 10 wherein at least some of the transmitting stages in each transmitting signal path include a frequency mixer having a respective transmitting stage center frequency, and wherein the combined upshifting effect of the frequency mixers in each transmitting signal path from the corresponding first transmitting stage to the last transmitting stage is to up-shift the center frequency of the corresponding input signal to a center frequency corresponding to the center frequencies of the transmitting stages in that transmitting signal path.

18. The DUC of claim 17 wherein one or more of the mid-transmitting stages and the last transmitting stage operates to combine up-shifted versions of the respective input signals received at each of the first transmitting stages to produce a combined output signal at the last transmitting stage.

* * * * *